US007487035B2

(12) United States Patent
Nozawa et al.

(10) Patent No.: US 7,487,035 B2
(45) Date of Patent: Feb. 3, 2009

(54) CYLINDER ABNORMALITY DIAGNOSIS UNIT OF INTERNAL COMBUSTION ENGINE AND CONTROLLER OF INTERNAL COMBUSTION ENGINE

(75) Inventors: Masaei Nozawa, Okazaki (JP); Yoshihiro Okuda, Kariya (JP); Masanori Kurosawa, Suntou-gun (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/984,020

(22) Filed: Nov. 13, 2007

(65) Prior Publication Data

US 2008/0114526 A1 May 15, 2008

(30) Foreign Application Priority Data

Nov. 15, 2006 (JP) ............................. 2006-309071
Nov. 24, 2006 (JP) ............................. 2006-316506
Dec. 8, 2006 (JP) ............................. 2006-331382

(51) Int. Cl.
*F02D 41/00* (2006.01)
*G06F 19/00* (2006.01)

(52) U.S. Cl. .................................... 701/114; 123/198 F

(58) Field of Classification Search ................. 701/114, 701/102, 108–109; 123/198 F, 674; 73/23.32
See application file for complete search history.

(56) References Cited

U.S. PATENT DOCUMENTS 5,299,550 A * 4/1994 Inoue ......................... 123/674
5,542,404 A 8/1996 Hasegawa et al.
5,566,071 A 10/1996 Akazaki et al.
5,947,096 A 9/1999 Kurokawa et al.
7,051,725 B2 5/2006 Ikemoto et al.
2008/0110239 A1 * 5/2008 Maegawa ................... 73/23.32

FOREIGN PATENT DOCUMENTS

JP 2001-050082 2/2001
JP 2001-304019 10/2001
JP 2003-254132 9/2003
JP 2005-9457 A * 1/2005
JP 2005-337194 12/2005
JP 2007-85176 A * 4/2007

* cited by examiner

*Primary Examiner*—Hieu T Vo
(74) *Attorney, Agent, or Firm*—Nixon & Vanderhye PC

(57) ABSTRACT

It is determined whether an engine operating state is within a specified operating range. When the engine operating state is within the specified operating range, the air-fuel ratio of an i-th cylinder is estimated based on the detection value of the air-fuel ratio sensor, and a cylinder deviation, which is the deviation of an estimated air-fuel ratio from a reference air-fuel ratio, is computed. When this cylinder deviation becomes larger than a specified determination value, the processing of incrementing the count value of an abnormality counter is started at a point in time when a specified delay time elapses after the cylinder deviation becomes larger than the specified determination value. At a point in time when the count value of the abnormality counter becomes larger than a specified abnormality determination value, it is determined that the air-fuel ratio of the i-th cylinder is abnormal.

12 Claims, 15 Drawing Sheets

CYLINDER ABNORMALITY DIAGNOSIS UNIT OF INTERNAL COMBUSTION ENGINE AND CONTROLLER OF INTERNAL COMBUSTION ENGINE

CROSS-REFERENCE TO RELATED APPLICATION

This application is based on Japanese Patent Applications No. 2006-309071 filed on Nov. 15, 2006, No. 2006-316506 filed on Nov. 24, 2006, and No. 2006-331382 filed on Dec. 8, 2006, the disclosure of which is incorporated herein by reference.

FIELD OF THE INVENTION

The present invention relates to a control unit of an internal combustion engine for estimating an air-fuel ratio of each cylinder based on the detection value of an air-fuel ratio sensor disposed in an exhaust confluent portion of the internal combustion engine, and to a cylinder abnormality diagnosis unit of an internal combustion engine for determining whether each cylinder is abnormal based on the estimate result.

BACKGROUND OF THE INVENTION

In order to improve the accuracy of an air-fuel ratio control of an internal combustion engine, as shown in Japanese Patent No. 2684011 (U.S. Pat. No. 5,542,404), JP-A-2005-207405 (U.S. Pat. No. 7,051,725B2), and Japanese Patent No. 3357572 (U.S. Pat. No. 5,947,096), there has been performed a cylinder air-fuel ratio control that performs the cylinder air-fuel ratio estimation of estimating the air-fuel ratio of each cylinder by the use of a model for relating the detection value of one air-fuel sensor disposed in an exhaust confluent portion where exhaust gases from plural cylinders merge with each other (air-fuel ratio of the exhaust mergence portion) to the air-fuel ratio of each cylinder. And it is computed an air-fuel ratio correction quantity for each cylinder so as to reduce variation in the air-fuel ratio of each cylinder between the cylinders based on the estimate result of the cylinder air-fuel ratio estimation and controls the air-fuel ratio of each cylinder (fuel injection quantity) based on the air-fuel ratio correction quantity for each cylinder.

In a control unit described in Japanese Patent No. 2684011, the cylinder abnormality diagnosis is performed for determining whether the air-fuel ratio correction quantity for each cylinder computed based on the estimate result of the cylinder air-fuel ratio estimation is within a specified range. It is determined that an abnormality occurs in a cylinder when an air-fuel ratio correction quantity for the cylinder is beyond the specified range.

In the cylinder air-fuel ratio estimation of estimating the air-fuel ratio of each cylinder based on the detection value of one air-fuel sensor disposed in an exhaust confluent portion, the estimate accuracy of the cylinder air-fuel ratio estimation is varied according to the operating range of the internal combustion engine. For example, in a high rotation range where the exhaust interval of exhaust gas of each cylinder is short and in a low load range where an exhaust gas quantity is small, the estimate accuracy of the cylinder air-fuel ratio estimation based on the detection value of the air-fuel ratio sensor tends to decrease.

However, in the control unit described in Japanese Patent 2684011, any consideration is never given to such a change in such estimate accuracy of the cylinder air-fuel ratio estimation that is caused by a difference in the operating range of the internal combustion engine. Accordingly, there is a possibility that the cylinder abnormality diagnosis using the estimate result of the cylinder air-fuel ratio estimation might be performed even within the operating range in which the estimate accuracy of the cylinder air-fuel ratio estimation decreases and that the diagnosis accuracy of the cylinder abnormality diagnosis hence might decrease.

In a control unit described in Japanese Patent 3357572, in order to prevent the estimate accuracy of the cylinder air-fuel ratio from being decreased by the deterioration of the responsivity of the air-fuel ratio sensor, the response speed of an air-fuel ratio sensor is determined and the timing of detecting an air-fuel ratio by the air-fuel ratio sensor is corrected according to the determination result.

When the responsivity of the air-fuel ratio sensor deteriorates, also the output value of the air-fuel ratio sensor may decrease. However, in the control unit described in Japanese Patent No. 3357572, any consideration is never given to the effect of a decrease in the output of the air-fuel ratio sensor when the responsivity of the air-fuel ratio sensor deteriorates. There is a possibility that the estimate accuracy of the cylinder air-fuel ratio based on the output of the air-fuel ratio sensor might be decreased by a decrease in the output of the air-fuel ratio sensor when the responsivity of the air-fuel ratio sensor deteriorates.

In a control unit described in JP-A-2005-207405, any consideration is never given to a change in such estimate accuracy of the cylinder air-fuel ratio estimation that is caused by a change in the operating state of the internal combustion engine. Accordingly, there is a possibility that the estimate accuracy of estimated air-fuel ratio of each cylinder might be decreased by the effect of the operating state of the internal combustion engine, which might involve a decrease in the control accuracy of the cylinder air-fuel ratio control based on the estimated air-fuel ratio of each cylinder.

SUMMARY OF THE INVENTION

The present invention has been made in consideration of these circumstances. Thus, an object of the present invention is to provide a cylinder abnormality diagnosis unit of an internal combustion engine capable of improving the diagnosis accuracy of a cylinder abnormality diagnosis using the estimate result of a cylinder air-fuel ratio estimation.

Moreover, another object of the present invention is to provide a control unit of an internal combustion engine capable of improving the estimate accuracy of a cylinder air-fuel ratio when the responsivity of an air-fuel ratio sensor deteriorates.

Furthermore, still another object of the present invention is to provide a control unit of an internal combustion engine capable of finding an estimated air-fuel ratio of each cylinder with high accuracy without being affected by the operating state of the internal combustion engine and capable of improving the control accuracy of a cylinder air-fuel ratio control based on the estimated air-fuel ratio of each cylinder.

To achieve the above-mentioned objects, in the present invention, a cylinder abnormality diagnosis apparatus includes an air-fuel ratio sensor for detecting the air-fuel ratio of exhaust gas which is disposed in an exhaust confluent portion where the exhaust gases from a plurality of cylinders of the internal combustion engine merge with each other. The apparatus includes a cylinder air-fuel ratio estimation means for performing the cylinder air-fuel ratio estimation of estimating the air-fuel ratio of each cylinder based on the detection value of the air-fuel ratio sensor. The apparatus includes a cylinder abnormality diagnosis means for performing the cylinder abnormality diagnosis of determining whether or not each cylinder is abnormal based on the estimate result of the cylinder air-fuel ratio estimation.

It is determined by determination means whether or not the operating state of the internal combustion engine is within a specified operating range in which the estimate accuracy of the cylinder air-fuel ratio estimation increases. When it is determined by the determination means that the operating state of the internal combustion engine is within the specified operating range, the cylinder abnormality diagnosis means performs the cylinder abnormality diagnosis.

According to this construction, it is possible to perform the cylinder abnormality diagnosis using the estimate result of the cylinder air-fuel ratio estimation only when the operating state of the internal combustion engine is within the specified range in which the estimate accuracy of the cylinder air-fuel ratio estimation increases, and to prevent the performance of the cylinder abnormality diagnosis using the estimate result of the cylinder air-fuel ratio estimation when the operating state of the internal combustion engine is within an operating range in which the estimate accuracy of the cylinder air-fuel ratio estimation decreases. Thus, it is possible to improve the diagnosis accuracy of the cylinder abnormality diagnosis using the estimate result of the cylinder air-fuel ratio estimation.

Moreover, in the present invention, in a control unit of an internal combustion engine in which an air-fuel ratio sensor is disposed in an exhaust confluent portion where exhaust gases from a plurality of cylinders of the internal combustion engine merge with each other and in which the air-fuel ratio of each cylinder is estimated based on the output of the air-fuel ratio sensor, the degree of deterioration of the responsivity of the air-fuel sensor is detected by sensor responsivity degree-of-deterioration detection means within the high load range of the internal combustion engine; and a correction gain relating to a decrease in the output of the air-fuel ratio sensor is learned by correction gain learning means based on the detected degree of deterioration of the responsivity of the air-fuel ratio sensor; and the estimated value of the air-fuel ratio is corrected by the use of a learned correction gain.

The responsivity of the air-fuel ratio sensor to a change in the air-fuel ratio can be detected with high accuracy within a high load range in which the exhaust gas quantity of the internal combustion engine increases. Further, when the responsivity of the air-fuel ratio sensor deteriorates, the output of the air-fuel ratio sensor decreases according to the degree of deterioration. Thus, when such degree of deterioration of the responsivity of the air-fuel ratio sensor that is detected within the high load range is used, a correction gain relating to a decrease in the output of the air-fuel ratio sensor can be learned with high accuracy. When the estimated value of the cylinder air-fuel ratio is corrected by the use of this correction gain, such estimate error of the cylinder air-fuel ratio that is caused by a decrease in the output of the air-fuel ratio sensor can be corrected with high accuracy. Thus, it is possible to improve the estimate accuracy of the cylinder air-fuel ratio when the responsivity of the air-fuel ratio sensor deteriorates.

Furthermore, in the present invention, in a control unit of an internal combustion engine in which an air-fuel ratio sensor for detecting the air-fuel ratio of exhaust gas is disposed in an exhaust confluent portion where the exhaust gases from a plurality of cylinders of the internal combustion engine merge with each other and which includes cylinder air-fuel ratio estimation means for estimating the air-fuel ratio of each cylinder based on the detection value of the air-fuel ratio sensor, the estimated air-fuel ratio of each cylinder is corrected by cylinder estimated air-fuel ratio correction means according to the operating state of the internal combustion engine. The air-fuel ratio of each cylinder is controlled by cylinder air-fuel ratio control means based on such estimated air-fuel ratio of each cylinder that is corrected.

In the cylinder air-fuel ratio estimation of estimating the air-fuel ratio of each cylinder based on the detection value of the air-fuel ratio sensor disposed in the exhaust mergence portion, the estimate accuracy of the cylinder air-fuel ratio estimation is varied according to the operating state of the internal combustion engine. Thus, when the estimated air-fuel ratio of each cylinder is corrected according to the operating state of the internal combustion engine, such estimate error of the estimated air-fuel ratio of each cylinder that is caused by a change in the operating state of the internal combustion engine can be corrected with high accuracy. The estimated air-fuel ratio of each cylinder can be found with high accuracy without being affected by the operating state of the internal combustion engine. Thus, when the cylinder air-fuel ratio control of controlling the air-fuel ratio of each cylinder is performed based on such estimated air-fuel ratio of each cylinder that is estimated with accuracy increased by this correction, it is possible to improve the control accuracy of the cylinder air-fuel ratio control.

DETAILED DESCRIPTION OF THE PREFERRED EMBODIMENTS

Figure 1:
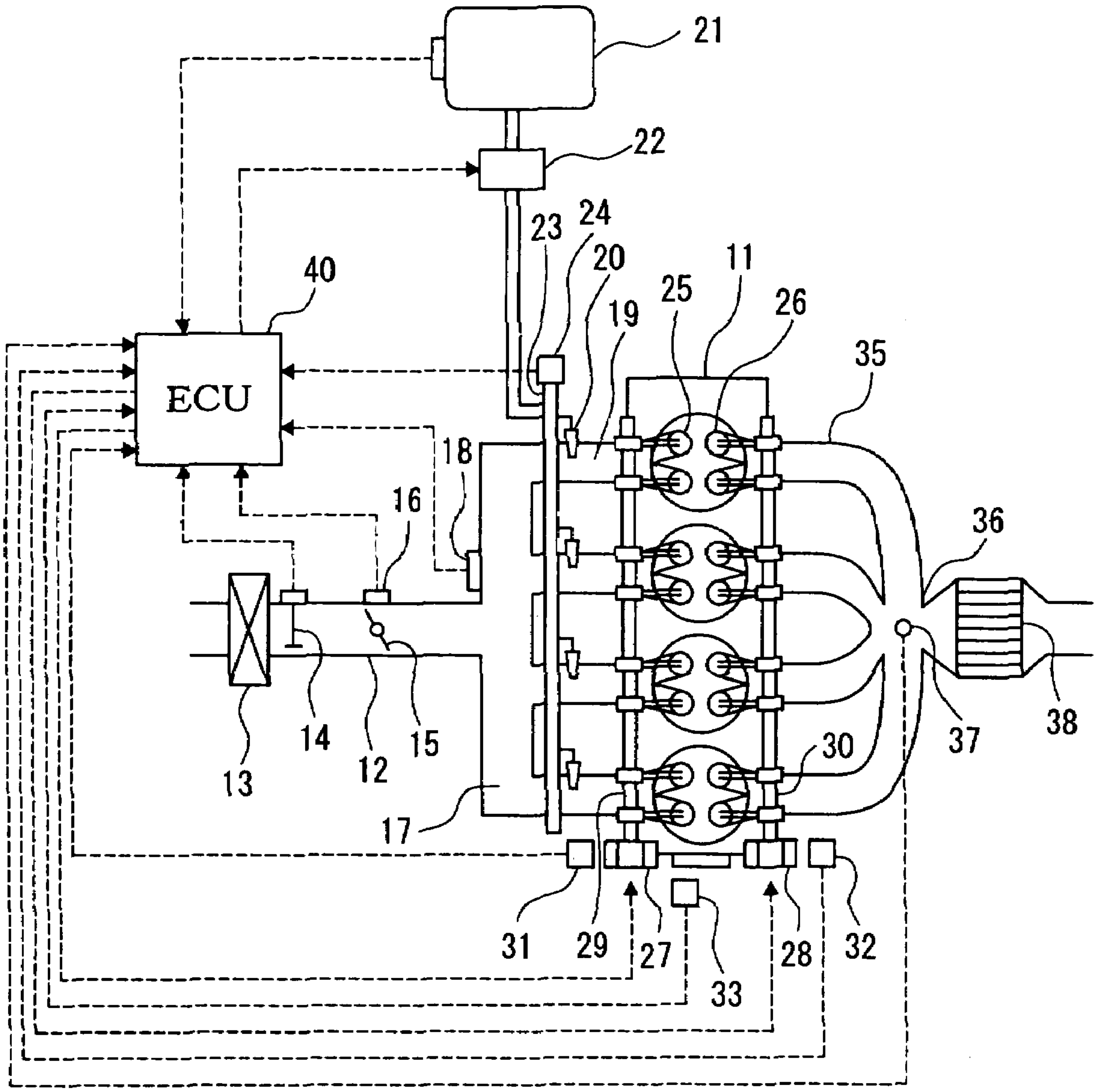
FIG. 1 is a general construction diagram of an entire engine control system in one embodiment of the present invention.

A first embodiment for carrying out the present invention will be described. First, the general construction of an entire engine control system will be described based on FIG. 1.

An air cleaner 13 is disposed at the most upstream portion of an intake pipe 12 of an internal combustion engine such as an in-line four-cylinder engine 11. An air flow meter 14 for detecting an intake air quantity is disposed downstream of this air cleaner 13. A throttle valve 15 and a throttle opening sensor 16 are disposed downstream of this air flow meter 14, the throttle valve 15 having the degree of opening adjusted by a motor or the like, the throttle opening sensor 16 detecting the degree of opening of the throttle valve 15.

Further, a surge tank 17 is disposed downstream of the throttle valve 15. The surge tank 17 is provided with an intake pipe pressure sensor 18 for detecting an intake pipe pressure. Moreover, the surge tank 17 is provided with intake manifolds 19 for introducing air into the respective cylinders of the engine 11. Fuel injection valves 20 for injecting fuel are disposed near the intake ports of the intake manifolds 19 of the respective cylinders. While the engine 11 is operated, fuel in a fuel tank 21 is sent to a delivery pipe 23 by a fuel pump 22 and is injected from the fuel injection valves 20 of the respective cylinders at the injection timings of the respective cylinders. The delivery pipe 23 is provided with a fuel pressure sensor 24 for detecting a fuel pressure.

Moreover, the engine 11 is provided with variable valve timing mechanisms 27, 28 that vary the opening/closing timings of intake valves 25 and exhaust valves 26, respectively. Furthermore, the engine 11 is provided with an intake cam angle sensor 31 and an exhaust cam angle sensor 32 that output cam angle signals in synchronization with the rotations of an intake cam shaft 29 and an exhaust cam shaft 30, respectively, and is provided with a crank angle sensor 33 for outputting the pulse of a crank angle signal at intervals of a specified crank angle (for example, at intervals of 30° CA) in synchronization with the rotation of the crankshaft of the engine 11.

On the other hand, an air-fuel ratio sensor 37 for detecting an air-fuel ratio of exhaust gas is disposed in an exhaust confluent portion 36 where the exhaust manifolds 35 of the respective cylinders of the engine 11 merges together. A catalyst 38 such as a three-way catalyst for cleaning CO, HC, NOx in the exhaust gas is disposed downstream of this air-fuel ratio sensor 37.

The outputs of various sensors such as the air-fuel ratio sensor 37 are inputted to an engine control unit (hereinafter denoted as "ECU") 40. This engine control unit 40 is mainly constructed of a microcomputer and executes various engine control programs stored in a built-in ROM (storage medium) to control the fuel injection quantities and the ignition timings of the fuel injection valves 20 of the respective cylinders according to an engine operating state.

Moreover, the ECU 40 executes a cylinder air-fuel ratio control routine shown in FIG. 2 to perform a cylinder air-fuel ratio control in the following manner: that is, while the engine 11 is operated, the ECU 40 performs the cylinder air-fuel ratio estimation of estimating an air-fuel ratio of each cylinder based on the detection value (actual air-fuel ratio of the exhaust gas flowing through the exhaust confluent portion 36) of the air-fuel ratio sensor 37 by the use of a cylinder air-fuel ratio estimation model to compute the average value of the estimated air-fuel ratios of all cylinders and sets the average value to a reference air-fuel ratio (target air-fuel ratio of all cylinders). The ECU 40 computes the deviation of the estimated air-fuel ratio from the reference air-fuel ratio for each cylinder and computes an air-fuel ratio correction quantity of each cylinder (correction quantity of the fuel injection quantity of each cylinder) so as to reduce the deviation; and the ECU 40 corrects the fuel injection quantity of each cylinder based on the computation result to correct the air-fuel ratio of an air-fuel mixture to be supplied to each cylinder, thereby reducing variation in the air-fuel ratio between the cylinders.

Here, a specific example of a model for estimating an air-fuel ratio of each cylinder (hereinafter referred to as "cylinder air-fuel ratio estimation model") based on the detection value (actual air-fuel ratio of the exhaust gas flowing through the exhaust confluent portion 36) of the air-fuel ratio sensor 37 will be described.

Paying attention to gas exchange in the exhaust confluent portion 36, the detection value of the air-fuel ratio sensor 37 is modeled as the sum of a term obtained by multiplying the history of estimated air-fuel ratio of each cylinder at the exhaust confluent portion 36 by a specified weight and another term obtained by multiplying the history of detection value by another specified weight. Here, a Kalman filter is used as an observer.

More specifically, the model of gas exchange at the exhaust confluent portion 36 is approximated by the following equation (1).

$$ys(t)=k1\times u(t-1)+k2\times u(t-2)-k3\times ys(t-1)-k4\times ys(t-2) \quad (1)$$

wherein ys is the detection value of the air-fuel ratio sensor 37, u is the air-fuel ratio of gas flowing into the exhaust confluent portion 36, and k1 to k4 are constants.

In an exhaust system, there exist a first-order delay element caused by gas inflow and gas mixture in the exhaust confluent portion 36 and a first-order delay element caused by a delay in the response of the air-fuel ratio sensor 37. Here, in the above-mentioned equation (1), the last two histories are referred to in consideration of these first-order delay elements.

When the above-mentioned equation (1) is transformed into a state space model, the following equations (2a), (2b) are derived.

$$X(t+1)=A\times X(t)+B\times u(t)+W(t) \quad (2a)$$

$$Y(t)=C\times X(t)+D\times u(t) \quad (2b)$$

wherein A, B, C, and D are parameters of the model, Y is the detection value of the air-fuel ratio sensor 37, X is an estimated air-fuel ratio of each cylinder as a state variable, and W is noise.

Further, when a Kalman filter is designed from the equations (2a) and (2b), the following equation (3) can be obtained.

$$X^{\wedge}(k+1|k)=A\times X^{\wedge}(k|k-1)+K\{Y(k)-C\times A\times X^{\wedge}(k|k-1)\} \quad (3)$$

wherein X^ is the estimated air-fuel ratio of each cylinder and K is a Kalman gain. The X^(k|k−1) expresses the finding of an estimated value at the next time (k+1) from an estimated value at a time (k).

By constructing the cylinder air-fuel ratio estimation model by the use of a Kalman filter type observer, the air-fuel ratio of each cylinder can be estimated sequentially with the progress of a combustion cycle.

In the cylinder air-fuel ratio estimation of estimating the air-fuel ratio of each cylinder based on the detection value of one air-fuel ratio sensor 37 disposed in the exhaust confluent portion 36, the estimate accuracy of the cylinder air-fuel ratio estimation is varied according to the operating range of the engine 11. For example, in a low rotation range in which the exhaust interval of exhaust gas of each cylinder become long and in a high load range in which an exhaust gas quantity becomes large, the estimate accuracy of the cylinder air-fuel ratio estimation based on the detection value of one air-fuel ratio sensor 37 tends to increase.

On the other hand, in a high rotation range in which the exhaust interval of exhaust gas of each cylinder become short and in a low load range in which an exhaust gas quantity becomes small, the estimate accuracy of the cylinder air-fuel ratio estimation based on the detection value of one air-fuel ratio sensor 37 tends to decrease. For this reason, when the cylinder abnormality diagnosis of determining whether or not each cylinder is abnormal based on the estimate result of the cylinder air-fuel ratio estimation is performed in the operating range in which the estimate accuracy of the cylinder air-fuel ratio estimation decreases, there is a possibility that the diagnosis accuracy of the cylinder abnormality diagnosis might decrease.

Thus, in this embodiment, the ECU 40 executes a cylinder abnormality diagnosis routine shown in FIG. 3 (to be described later) to perform the cylinder abnormality diagnosis of determining whether or not each cylinder is abnormal based on the estimate result of the cylinder air-fuel ratio estimation in the following manner. First, it is determined whether or not the operating state of the engine is within a specified operating range. Here, the specified operating range is an operating range, in which the estimate accuracy of the cylinder air-fuel ratio estimation based on the detection value of the air-fuel ratio sensor 37 increases, and is set to, for example, a low rotation and high load range. The specified operating range may be changed as appropriate and may be set to, for example, a low rotation range or a high load range. In short, it suffices to set the specified operating range to an operating range in which the estimate accuracy of the cylinder air-fuel ratio estimation based on the detection value of the air-fuel ratio sensor 37 increases to an appropriate degree (degree capable of securing the diagnosis accuracy of the cylinder abnormality diagnosis).

When it is determined that the engine operating state is within the specified operating range, the cylinder abnormality diagnosis using the estimate result of the cylinder air-fuel ratio estimation is performed. With this, it is possible to perform the cylinder abnormality diagnosis using the estimate result of the cylinder air-fuel ratio estimation only when the engine operating state is within the specified operating range in which the estimate accuracy of the cylinder air-fuel ratio estimation increases and it is possible to prevent the cylinder abnormality diagnosis using the estimate result of the cylinder air-fuel ratio estimation from being performed when the engine operating state is within an operating range in which the estimate accuracy of the cylinder air-fuel ratio estimation decreases.

Figure 2:
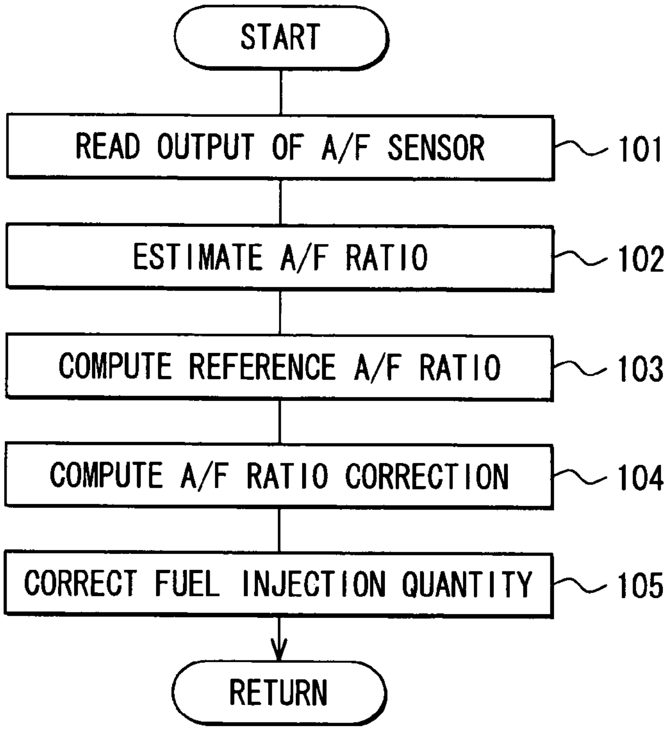
FIG. 2 is a flow chart to show the flow of the processing of a cylinder air-fuel ratio control routine.

Here, in the cylinder air-fuel ratio control routine shown in FIG. 2, the cylinder air-fuel ratio estimation is performed even when the engine operating state is within an operating range other than the specified operating range to perform the cylinder air-fuel ratio control.

Figure 3:
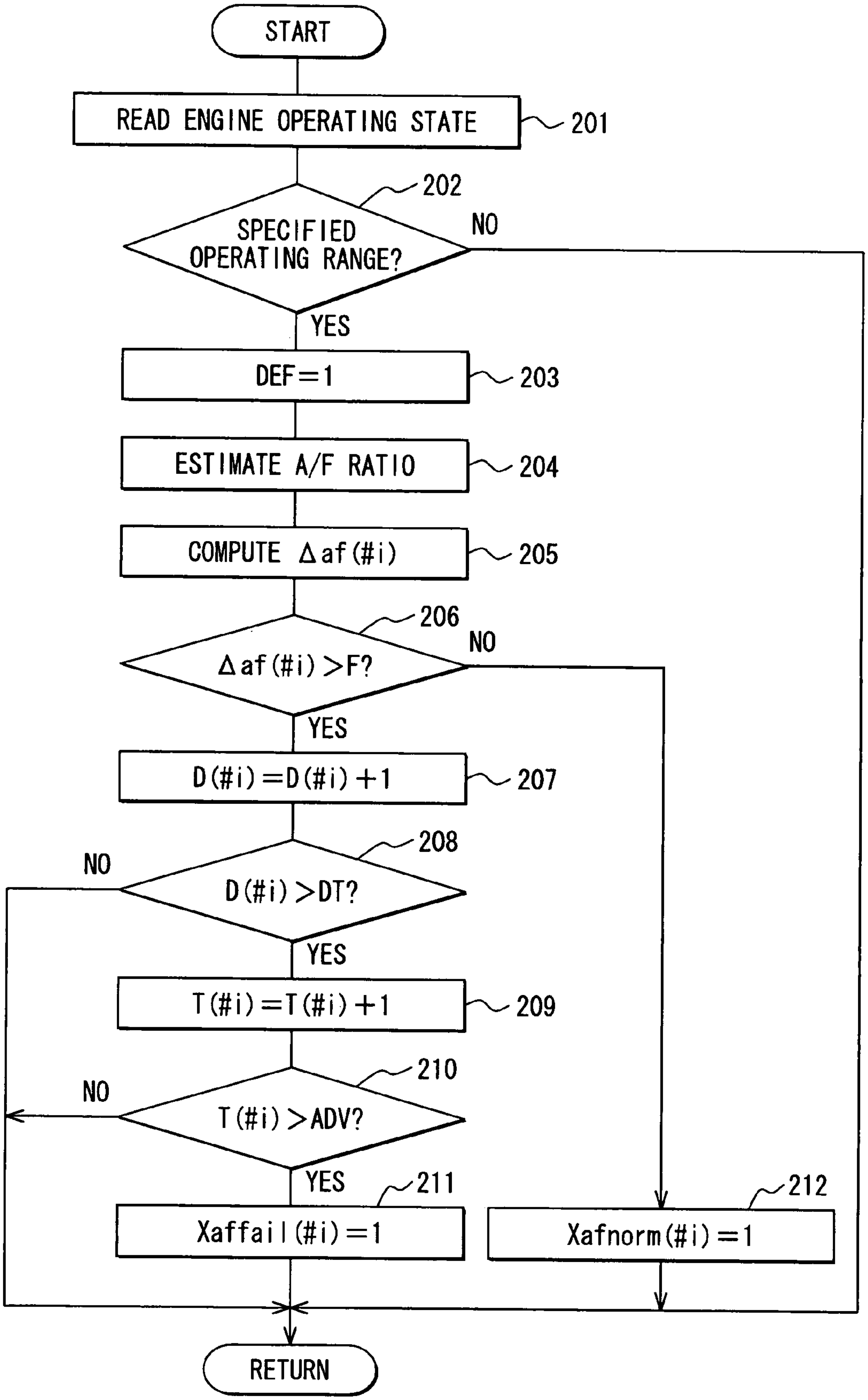
FIG. 3 is a flow chart to show the flow of the processing of a cylinder abnormality diagnosis routine.

The cylinder air-fuel ratio control and the cylinder abnormality diagnosis described above are performed by the ECU 40 according to the respective routines shown in FIG. 2 and FIG. 3. The processing contents of the respective routines will be described below.

[Cylinder Air-Fuel Ratio Control Routine]

The cylinder air-fuel ratio control routine shown in FIG. 2 is performed at specified intervals (for example, at intervals of 30° CA) while the power of the ECU 40 is on. When this routine is started, first, in Step 101, the output of the air-fuel ratio sensor 37 (air-fuel ratio detection value) is read. Then, the routine proceeds to Step 102 where the air-fuel ratio of a specified cylinder is estimated based on the detection value of the air-fuel ratio sensor 37 by the use of the cylinder air-fuel ratio estimation model.

Then, the routine proceeds to Step 103 where the average of the estimated air-fuel ratios of all cylinders is computed and where the average is set to a reference air-fuel ratio (target air-fuel ratio of all cylinders). Then, the routine proceeds to Step 104 where the deviation of the estimated air-fuel ratio of each cylinder from the reference air-fuel ratio is computed and where a cylinder air-fuel ratio correction quantity (correction quantity of fuel injection quantity of each cylinder) is computed so as to reduce the deviation.

Then, the routine proceeds to Step 105 where the fuel injection quantity of each cylinder is corrected based on the cylinder air-fuel ratio correction quantity of each cylinder. The air-fuel ratio of an air-fuel mixture is corrected to reduce variation in the air-fuel ratio of each cylinder between the cylinders.

[Cylinder Abnormality Diagnosis Routine]

The cylinder abnormality diagnosis routine shown in FIG. 3 is executed at specified intervals (for example, at intervals of 30° CA) while the power of the ECU 40 is on. When this routine is started, first, in Step 201, the engine operating states such as an engine speed and an engine load (intake air quantity and intake pipe pressure) are read and then the routine proceeds to Step 202 where it is determined whether or not the present engine operating state is within a specified operating range. Here, the specified operating range is an operating range, in which the estimate accuracy of the cylinder air-fuel ratio estimation based on the detection value of the air-fuel ratio sensor 37 increases, and is set to, for example, a low rotation and high load range.

When it is determined in this Step 202 that the present operating state is not within the specified operating range, the present operating state is within an operating range in which the estimate accuracy of the cylinder air-fuel ratio estimation decreases and hence it is determined that there is a possibility that the diagnosis accuracy of the cylinder abnormality diagnosis using the estimate result of the cylinder air-fuel ratio estimation might decrease. Thus, this routine is finished without performing processing relating to the cylinder abnormality diagnosis in the Step 203 and subsequent steps.

On the other hand, when it is determined in this Step 202 that the present engine operating state is within the specified operating range, the present engine operating state is within an operating range in which the estimate accuracy of the cylinder air-fuel ratio estimation increases and hence it is determined that the diagnosis accuracy of the cylinder abnormality diagnosis using the estimate result of the cylinder air-fuel ratio estimation can be secured. Thus, the processing relating to the cylinder abnormality diagnosis in the Step 203 and subsequent steps is performed in the following manner.

First, a diagnosis execution flag DEF is set to "1" in Step 203 and then the routine proceeds to Step 204 where the air-fuel ratio of an i-th cylinder #i (i=1 to 4 in the case of a four-cylinder engine) is estimated based on the detection value of the air-fuel ratio sensor 37 by the use of the cylinder air-fuel ratio estimation model. Here, the air-fuel ratio of the i-th cylinder #i, which is estimated by the air-fuel ratio control routine shown in FIG. 2, may be read.

Then, the routine proceeds to Step 205 where the deviation of the estimated air-fuel ratio AF(#i) of the i-th cylinder #i from the reference air-fuel ratio (the average of the estimated air-fuel ratios of all cylinders or a control target value) is computed, thereby computing a cylinder deviation Δaf(#i) of the air-fuel ratio of the i-th cylinder #i. Then, the routine proceeds to Step 206 where it is determined whether or not the cylinder deviation Δaf(#i) of the air-fuel ratio of the i-th cylinder #i is larger than a specified determination value F.

As a result, when it is determined that the cylinder deviation Δaf(#i) of the air-fuel ratio of the i-th cylinder #i is not larger than the specified determination value F, the routine proceeds to Step 212 where it is determined that the air-fuel ratio of the i-th cylinder #i is not abnormal (is normal) and where a normal flag Xafnorm (#i) of the i-th cylinder #i is set to "1" and then this routine is finished.

When it is determined in Step 206 that the cylinder deviation Δaf(#i) of the air-fuel ratio of the i-th cylinder #i is larger than the specified determination value F, the routine proceeds to Step 207 where the count value of a delay counter D(#i) of the i-th cylinder #i is incremented by "1", the delay counter D(#i) measuring the time that elapses after the cylinder deviation Δaf(#i) of the air-fuel ratio of the i-th cylinder #i becomes larger than the specified determination value F. Then, the routine proceeds to Step 208 where by determining whether or not the count value of the delay counter D(#i) is larger than a specified delay value, it is determined whether or not a specified delay time elapses after the cylinder deviation Δaf (#i) becomes larger than the specified determination value F.

When it is determined in this Step 208 that the count value of the delay counter D(#i) becomes larger than the specified delay value (the specified delay time elapses after the cylinder deviation Δaf(#i) becomes larger than the specified determination value F), the routine proceeds to Step 209 where the processing of incrementing the count value of an abnormality counter T(#i) of the i-th cylinder #i by "1" is started. Then, the routine proceeds to Step 210 where it is determined whether or not the count value of the abnormality counter T(#i) becomes larger than a specified abnormality determination value ADV.

When it is determined in this Step 210 that the count value of the abnormality counter T(#i) is not larger than the specified abnormality determination value, the routine is finished without performing any processing and when the engine operating state is within the specified operating range and the cylinder deviation Δaf(#i) is larger than the specified determination value F, the processing of incrementing the count value of the abnormality counter T(#i) (Steps 201 to 209) is repeatedly performed. Here, when the engine operating state is not within the specified operating range or the cylinder deviation Δaf(#i) is not larger than the specified determination value F, the count value of the abnormality counter T(#i) is not incremented but the present count value is held.

Then, when it is determined in this Step 210 that the count value of the abnormality counter T(#i) becomes larger than the specified abnormality determination value, the routine proceeds to Step 211 where: it is determined that the air-fuel ratio of the i-th cylinder #i is abnormal; an abnormal flag Xaffail (#i) of the i-th cylinder #i is set to "1"; an alarm lamp (not shown) disposed on the instrument panel of a driver's seat is lit or an alarm is displayed on an alarm display part (not shown) of the instrument panel of the driver's seat to give the driver an alarm; and its abnormality information (abnormality code and the like) is stored in a rewritable non-volatile memory such as a backup RAM (not shown) of the ECU 40. Then, this routine is finished.

When it is determined in Step 206 that the cylinder deviation Δaf(#i) is not larger than the specified determination value F before it is determined in Step 210 that the count value of the abnormality counter T(#i) is larger than the specified abnormality determination value, the routine proceeds to Step 212 where it is determined that the air-fuel ratio of the i-th cylinder #i is not abnormal (is normal) and where the normal flag Xafnorm (#i) of the i-th cylinder #i is set to "1" and then this routine is finished.

Figure 4:
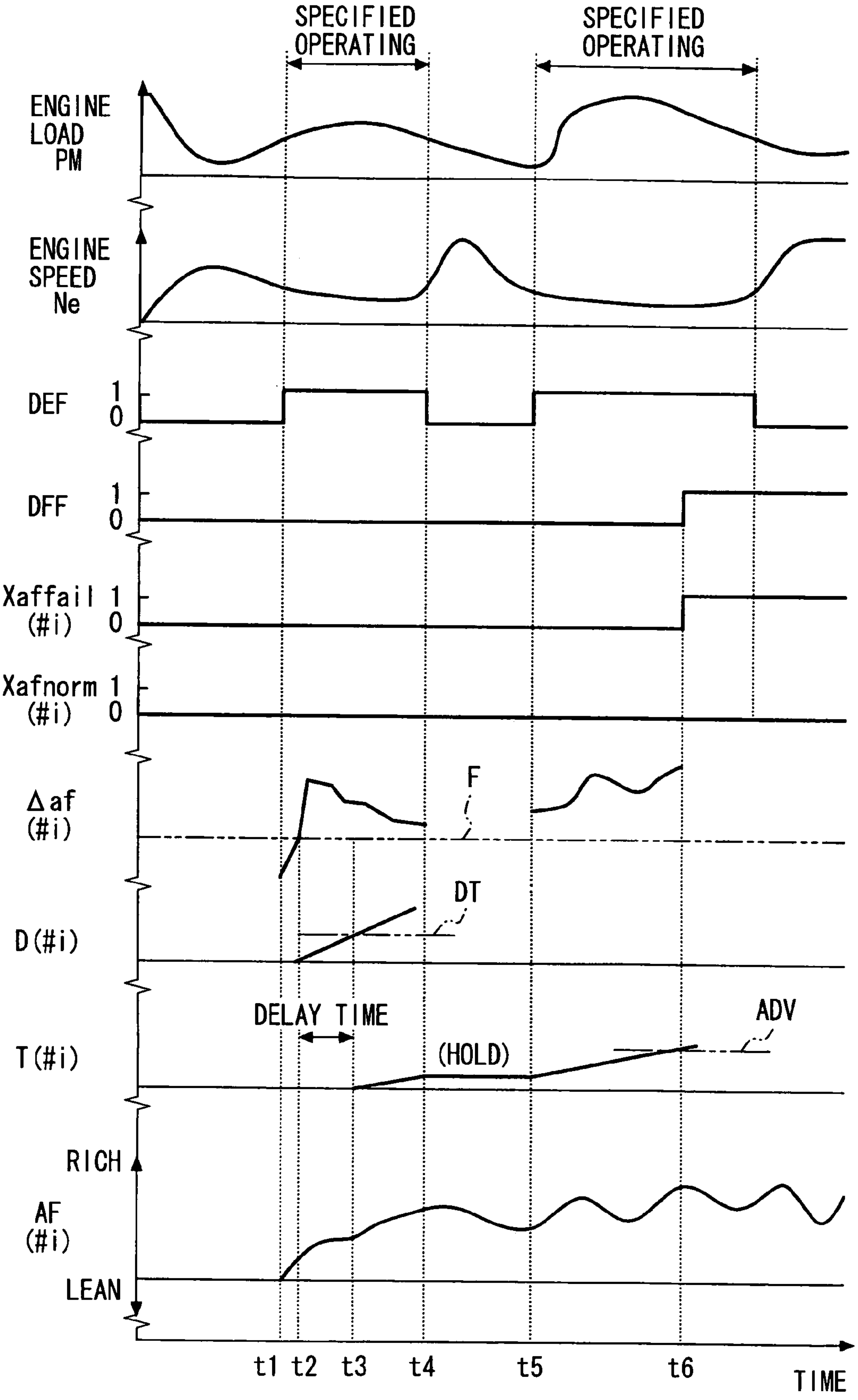
FIG. 4 is a time chart to show an example of performing a cylinder abnormality diagnosis of a first embodiment.

An example of the cylinder abnormality diagnosis of this embodiment described above will be described by the use of the time chart shown in FIG. 4. As shown in FIG. 4, the diagnosis execution flag DEF is set to "1" and the cylinder abnormality diagnosis is started at the point t1 in time when the engine operating state is brought into a specified operating range (an operating range in which the estimate accuracy of the cylinder air-fuel ratio estimation increases, for example, a low rotation and high load range).

First, the air-fuel ratio of the i-th cylinder #i is estimated based on the detection value of the air-fuel ratio sensor 37, and the cylinder deviation Δaf(#i) of the deviation of the estimated air-fuel ratio AF(#i) from the reference air-fuel ratio is computed. At the point t2 in time when the cylinder deviation Δaf(#i) becomes larger than the specified determination value F, the processing of incrementing the count value of the delay counter D(#i) is started. Then, at the point t3 in time when the count value of the delay counter D(#i) becomes larger than a specified delay value DT (in other words, when a specified delay time elapses after the cylinder deviation Δaf(#i) becomes larger than the specified determination value F), the processing of incrementing the count value of the abnormality counter T(#i) is started.

Then, during a period in which the engine operating state is within an operating range other than the specified operating range (that is, during a period from the point t4 in time when the engine operating state is brought into an operating range other than the specified operating range to the point t5 in time when the engine operating state is again brought into the specified operating range), the count value of the abnormality counter T(#i) is not incremented but is held. When the cylinder deviation Δaf(#i) is larger than the specified determination value F at the point t5 in time when the engine operating state is again brought into the specified operating range, the processing of incrementing the count value of the abnormality counter T(#i) is again started.

Then, at the point t6 in time when the count value of the abnormality counter T(#i) becomes larger than the abnormality determination value ADV, it is determined that the air-fuel ratio of the i-th cylinder #i is abnormal and the abnormal flag Xaffail (#i) of the i-th cylinder #i is set to "1" and the diagnosis finish flag DFF is set to "1" and then the cylinder abnormality diagnosis is finished.

In the first embodiment described above, it is determined whether or not the engine operating state is within the specified operating range (the operating range in which the estimate accuracy of the cylinder air-fuel ratio estimation increases) and when it is determined that the engine operating state is within the specified operating range, the cylinder abnormality diagnosis using the estimate result of the cylinder air-fuel ratio estimation is performed. With this, it is possible to perform the cylinder abnormality diagnosis using the estimate result of the cylinder air-fuel ratio estimation only when the engine operating state is within the specified operating range in which the estimate accuracy of the cylinder air-fuel ratio estimation increases and it is possible to prevent the cylinder abnormality diagnosis using the estimate result of the cylinder air-fuel ratio estimation from being performed when the engine operating state is within an operating range in which the estimate accuracy of the cylinder air-fuel ratio estimation decreases. Thus, it is possible to improve the diagnosis accuracy of the cylinder abnormality diagnosis using the estimate result of the cylinder air-fuel ratio estimation.

Moreover, in this embodiment, the cylinder air-fuel ratio estimation is performed also when the engine operating state is within an operating range other than the specified operating range to perform the cylinder air-fuel ratio control. Thus, it is possible to perform the cylinder abnormality diagnosis within the specified operating range to secure the diagnosis accuracy of the cylinder abnormality diagnosis, and it is possible to perform the cylinder air-fuel ratio control also when the engine operating state is within the operating range other than the specified operating range, where variation in the air-fuel ratio of each cylinder between the cylinders can be reduced.

In this regard, the estimate method of the cylinder air-fuel ratio estimation and the diagnosis method of the cylinder abnormality diagnosis are not limited to the methods described in the above-mentioned embodiment but may be changed as appropriate. For example, the air-fuel ratio of each cylinder may be estimated based on the output of the air-fuel ratio sensor 37 when the air-fuel ratio dither control of forcibly varying an air-fuel ratio for each cylinder is performed.

Second Embodiment

Moreover, the ECU 40 performs the respective routines for the cylinder air-fuel ratio control (to be described later) shown in FIG. 5 to FIG. 8. While the engine is operated, the ECU 40 estimates the air-fuel ratio of each cylinder (cylinder air-fuel ratio) based on the detection value of the air-fuel ratio sensor 37 by the use of a model (hereinafter referred to as "cylinder air-fuel ratio estimation model"). The model relates the detection value of the air-fuel ratio sensor 37 to the air-fuel ratio of each cylinder. The ECU 40 computes the deviation of the estimated air-fuel ratio of each cylinder from the reference air-fuel ratio (average of the estimated air-fuel ratios of all cylinders or a control target value), thereby computing variation in the air-fuel ratio of each cylinder between the cylinders. Then, the ECU 40 computes an air-fuel ratio correction factor of each cylinder (a correction factor of the fuel injection quantity of each cylinder) so as to reduce the variation in the air-fuel ratio of each cylinder between the cylinders. Based on the computation result, the ECU 40 performs the cylinder air-fuel ratio control of correcting the fuel injection quantity of each cylinder to correct the air-fuel ratio of the air-fuel mixture to be supplied to each cylinder to reduce variation in the air-fuel ratio of each cylinder between the cylinders.

When the responsivity of the air-fuel ratio sensor 37 deteriorates, the output value of the air-fuel ratio sensor 37 may decrease. This decrease in the output of the air-fuel ratio sensor 37 may decrease the estimate accuracy of the cylinder air-fuel ratio based on the output of the air-fuel ratio sensor 37.

In the second embodiment, the degree of deterioration of the responsivity of the air-fuel ratio sensor 37 is detected in the high load range of the engine 11, and a correction gain relating to the degree of deterioration of the responsivity of the air-fuel ratio sensor 37 is computed. With this, the correction gain relating to a decrease in the output of the air-fuel ratio sensor 37 is found and learned, and by using this correction gain, the estimated value of the cylinder air-fuel ratio is corrected.

In the high load range in which exhaust gas quantity of the engine 11 increases, the responsivity of the air-fuel ratio sensor 37 to a change in the air-fuel ratio can be detected with high accuracy. Further, when the responsivity of the air-fuel ratio sensor 37 deteriorates, the output of the air-fuel ratio sensor 37 decreases according to the degree of deterioration. Thus, by finding a correction gain relating to the degree of deterioration of the responsivity of the air-fuel ratio sensor 37, which is detected in the high load range, the correction gain relating to a decrease in the output of the air-fuel ratio sensor 37 can be learned with high accuracy. By correcting the estimated value of the cylinder air-fuel ratio by the use of this correction gain, such estimate error of the cylinder air-fuel ratio that is caused by the decrease in the output of the air-fuel ratio sensor 37 can be corrected with high accuracy.

The processing contents of the respective routines for the cylinder air-fuel ratio control performed by the ECU 40 and shown in FIG. 5 to FIG. 8 will be described below.

[Cylinder Air-Fuel Ratio Control Routine]

Figure 5:
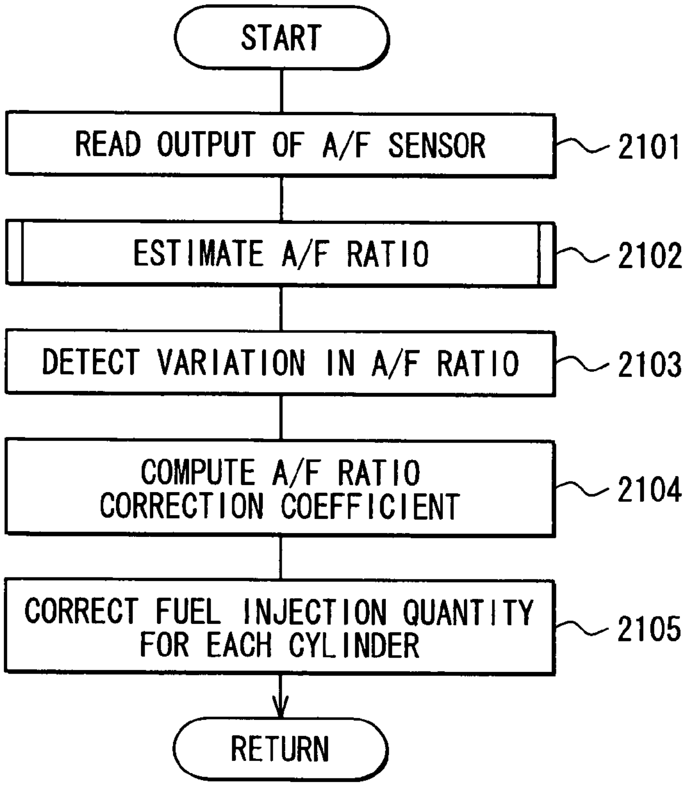
FIG. 5 is a flow chart to show the flow of the processing of a cylinder air-fuel ratio control routine of a second embodiment.
Figure 6:
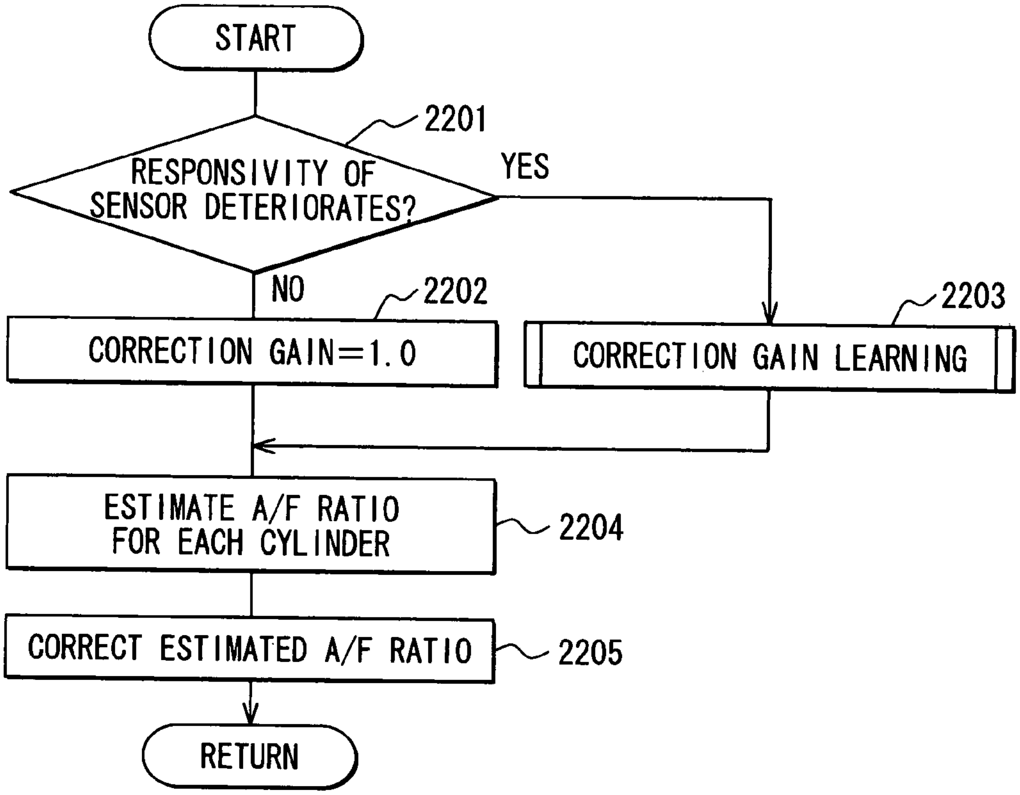
FIG. 6 is a flow chart to show the flow of the processing of a cylinder air-fuel ratio estimation routine of the second embodiment.

The cylinder air-fuel ratio control routine shown in FIG. 5 is performed at specified intervals while the power of the ECU 40 is on. When this routine is started, first, in Step 2101, the output of the air-fuel ratio sensor 37 (air-fuel ratio detection value) is read. Then, the routine proceeds to Step 2102 where the cylinder air-fuel ratio estimation routine (to be described later) shown in FIG. 6 is performed to estimate the air-fuel ratio of each cylinder based on the detection value of the air-fuel ratio sensor 37 and where the estimated air-fuel ratio of each cylinder is corrected by the use of the correction gain.

Then, the routine proceeds to Step 2103 where the deviation of the estimated air-fuel ratios of each cylinder, which is corrected by the use of the correction gain, from the reference air-fuel ratio (average of estimated air-fuel ratios of all cylinders or a control target value) is computed to compute variation in the air-fuel ratio of each cylinder between the cylinders.

Then, the routine proceeds to Step 2104 where an air-fuel ratio correction coefficient of each cylinder (correction factor of the fuel injection quantity of each cylinder) is computed so as to reduce the deviation. Then, the routine proceeds to Step 2105 where the cylinder air-fuel ratio control is performed. The cylinder air-fuel ratio control corrects the fuel injection quantity of each cylinder based on the cylinder air-fuel ratio correction coefficient of each cylinder to correct the air-fuel ratio of the air-fuel mixture, thereby the variation in the air-fuel ratio of each cylinder between the cylinders is reduced.

[Cylinder Air-Fuel Ratio Estimation Routine]

The cylinder air-fuel ratio estimation routine shown in FIG. 6 is a subroutine executed in Step 2102 of the cylinder air-fuel ratio control routine shown in FIG. 5. When this subroutine is started, first, it is determined in Step 2201 whether or not the responsivity of the air-fuel ratio sensor 37 deteriorates based on the diagnosis result of a sensor responsivity deterioration diagnosis routine (not shown). Specifically, the response time T of the air-fuel ratio sensor 37 is measured by a method to be described later and is compared with a specified deterioration determination value (or the last value of the response time T) to determine whether or not the responsivity of the air-fuel ratio sensor 37 deteriorates.

When it is determined in this Step 2201 that the responsivity of the air-fuel ratio sensor 37 does not deteriorate, the routine proceeds to Step 2202 where the correction gain is set to "1.0". In this case, the estimated air-fuel ratio of each cylinder is not corrected substantially.

Figure 7:
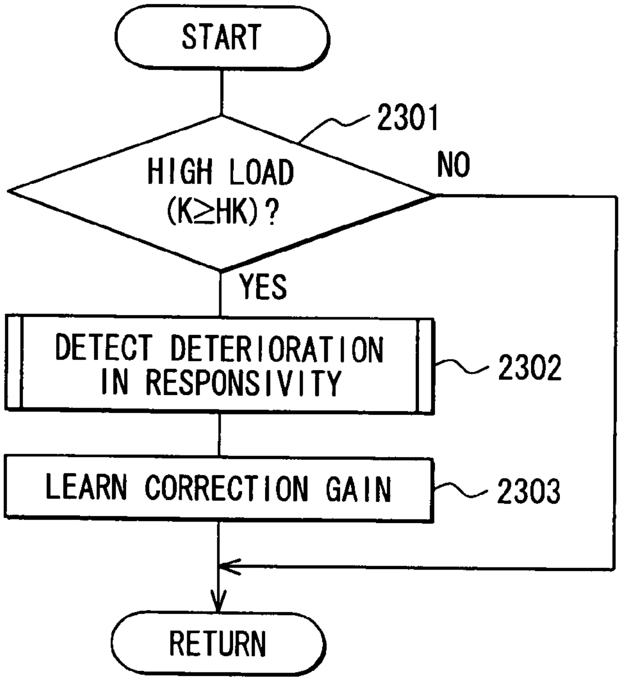
FIG. 7 is a flow chart to show the flow of the processing of a correction gain learning routine of the second embodiment.

On the other hand, when it is determined in this Step 2201 that the responsivity of the air-fuel ratio sensor 37 deteriorates, the routine proceeds to Step 2203 where the correction gain learning routine (to be described later) shown in FIG. 7 is executed to detect the degree of deterioration of the responsivity of the air-fuel ratio sensor 37 in the high load range of the engine 11 to learn a correction gain relating to a decrease in the output of the air-fuel ratio sensor 37 based on the degree of deterioration of the air-fuel ratio sensor 37.

Then, the routine proceeds to Step 2204 where the air-fuel ratio of a cylinder, the air-fuel ratio of which is to be estimated this time, is estimated based on the detection value of the air-fuel ratio sensor 37 by the use of the cylinder air-fuel ratio estimation model. Then, the routine proceeds to Step 2205 where the air-fuel ratio of each cylinder is multiplied by the correction gain to correct the estimated air-fuel ratio of each cylinder to find the final estimated air-fuel ratio of each cylinder.

[Correction Gain Learning Routine]

The correction gain learning routine shown in FIG. 7 is a subroutine executed in Step 2203 of the cylinder air-fuel ratio estimation routine shown in FIG. 6. When this subroutine is started, first, it is determined in Step 2301 whether or not the engine operating state is within the high load range, for example, by whether or not an engine load K (a suction air quantity or a suction pipe pressure) is a specified value HK or more. When it is determined in this Step 2301 that the engine operating state is not within the high load range, this routine is finished without performing processing relating to correction gain learning in Step 2302 and subsequent steps.

Thereafter, when it is determined in Step 2301 that the engine operating state is within the high load range, the processing relating to correction gain learning in Step 2302 and subsequent steps is performed in the following manner. In Step 2302, a routine for detecting the degree of deterioration in the responsivity of a sensor (to be described later) shown in FIG. 8 is executed to detect the degree of deterioration R of the responsivity of the air-fuel ratio sensor 37 is detected in the high load range of the engine 11.

Thereafter, the routine proceeds to Step 2303 where a correction gain relating to the degree of deterioration R of the responsivity of the air-fuel ratio 37 is computed by a map or a mathematical equation to find the correction gain relating to a decrease in the output of the air-fuel ratio 37 and where this correction gain is stored in the rewritable non-volatile memory such as the backup RAM of the ECU 40 to learn the correction gain.

[Sensor Responsivity Degree-of-Deterioration Detection Routine]

Figure 8:
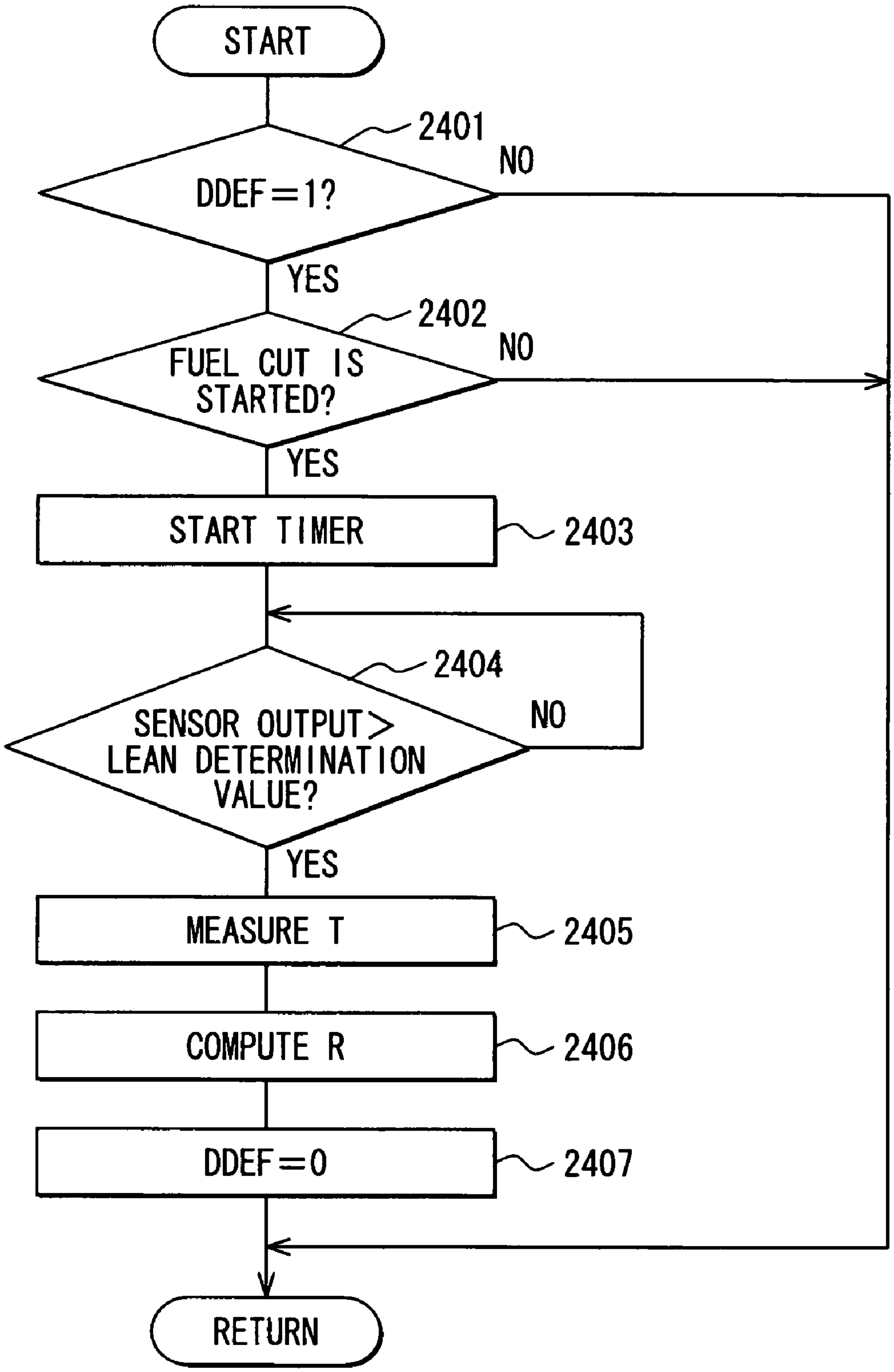
FIG. 8 is a flow chart to show the flow of the processing of a sensor responsivity degree-of-deterioration detection routine of the second embodiment.

The sensor responsivity degree-of-deterioration detection routine shown in FIG. 8 is a subroutine executed in Step 2302 of the correction gain learning routine shown in FIG. 7. When this subroutine is started, first, it is determined in Step 2401 whether or not a degree-of-deterioration detection execution flag DDEF is set to "1". This degree-of-deterioration detection execution flag DDEF is set to "1" every time the engine 11 is started (for example, every time the power of the ECU 40 is turned on). Alternatively, the degree-of-deterioration detection execution flag DDEF may be set to "1" every time an integrated mileage or an integrated time from the time when the degree of deterioration of the responsivity of the air-fuel ratio sensor 37 is detected last time becomes larger than a specified value.

When it is determined in this Step 2401 that the degree-of-deterioration detection execution flag DDEF is set to "1", processing relating to the detection of the degree of deterioration in Step 2402 and subsequent steps is performed in the following manner. First, it is determined in Step 2402 whether or not fuel cut is started. When it is determined that fuel cut is started, the routine proceeds to Step 2403 where a timer is started to measure the time that elapses from the start of the fuel cut.

Figure 9:
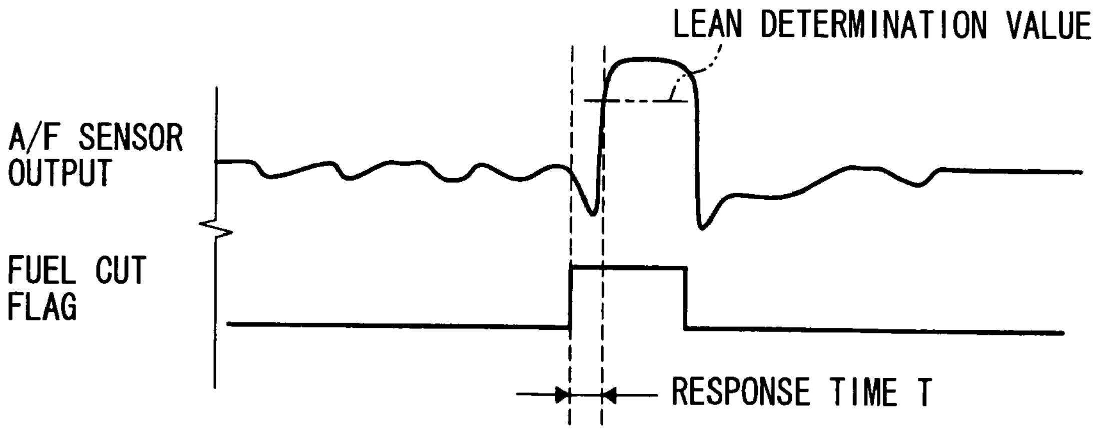
FIG. 9 is a time chart to show a method for detecting a response time of an air-fuel ratio sensor of the second embodiment.

Thereafter, the routine proceeds to Step 2404 where it is determined whether or not the output of the air-fuel ratio sensor 37 becomes larger than a specified leanness determination value. When it is determined that the output of the air-fuel ratio sensor 37 becomes larger than the specified leanness determination value, the routine proceeds to Step 2405 where, as shown in FIG. 9, a response time T that elapses after fuel cut is started until the output of the air-fuel ratio sensor 37 becomes larger than the leanness determination value is measured based on the count value of the timer.

Then, the routine proceeds to Step 2406 where this deterioration of responsivity ΔR is found based on the difference between this response time T(i) of the air-fuel ratio sensor 37 and the last response time T(i−1) and where this deterioration of responsivity ΔR is integrated with the last degree of deterioration R(i−1) of the responsivity of the air-fuel ratio sensor 37 to find this degree of deterioration R(i) of the responsivity of the air-fuel ratio sensor 37.

$$R(i)=R(i-1)+\Delta R$$

In this regard, this degree of deterioration R(i) of the responsivity of the air-fuel ratio sensor 37 may be found based on the difference between this response time T(i) of the air-fuel ratio sensor 37 and an initial response time T0 (a response time when the responsivity does not deteriorate).

The degree of deterioration R(i) of the responsivity of the air-fuel ratio sensor 37 found in this manner is stored in the rewritable non-volatile memory of the ECU 40 such as backup RAM.

Then, the routine proceeds to Step 2407 where the degree-of-deterioration detection performance flag DDEF is reset to "0" and then this routine is finished.

On the other hand, when it is determined in Step 2401 that the degree-of-deterioration detection performance flag is reset to "0", this routine is finished without performing processing relating to the detection of the degree of deterioration in Step 2402 and subsequent steps.

Here, this routine, as shown in FIG. 9, finds the response time T that elapses after fuel cut is started until the output of the air-fuel ratio sensor 37 becomes larger than the specified leanness determination value. However, it is also recommendable to find a response time T that elapses after fuel cut is finished until the output of the air-fuel sensor 37 becomes larger than a specified richness determination value.

Figure 10:
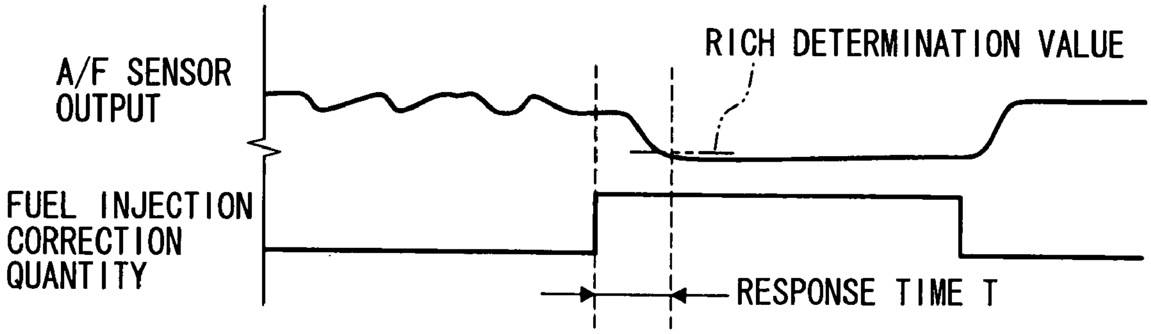
FIG. 10 is a time chart to show another method for detecting a response time of an air-fuel ratio sensor of the second embodiment.

Alternatively, as shown in FIG. 10, it is also recommendable to find a response time T that elapses after a fuel injection quantity is forcibly increased (or decreased) for correction when the operating state of the engine 11 is in a steady state to forcibly change an air-fuel ratio in a rich direction (or in a lean direction) until the output of the air-fuel ratio sensor 37 becomes larger than a specified richness determination value (a specified leanness determination value).

In this second embodiment described above, the degree of deterioration of the responsivity of the air-fuel ratio sensor 37 is detected within the high load range of the engine 11 and a correction gain relating to the degree of deterioration of the responsivity of the air-fuel ratio sensor 37 is computed, whereby a correction gain relating to a decrease in the output of the air-fuel ratio sensor 37 is found and learned, and then the estimated value of the cylinder air-fuel ratio is corrected by the use of this correction gain. Thus, it is possible to accurately correct such estimate error of the cylinder air-fuel ratio that is caused by a decrease in the output of the air-fuel ratio sensor 37 and to improve the estimate accuracy of the cylinder air-fuel ratio when the responsivity of the air-fuel ratio sensor 37 deteriorates and hence to improve the detection accuracy of variation in the air-fuel ratio of each cylinder between the cylinders.

Third Embodiment

Next, a third embodiment of the present invention will be described with reference to FIG. 11.

Figure 11:
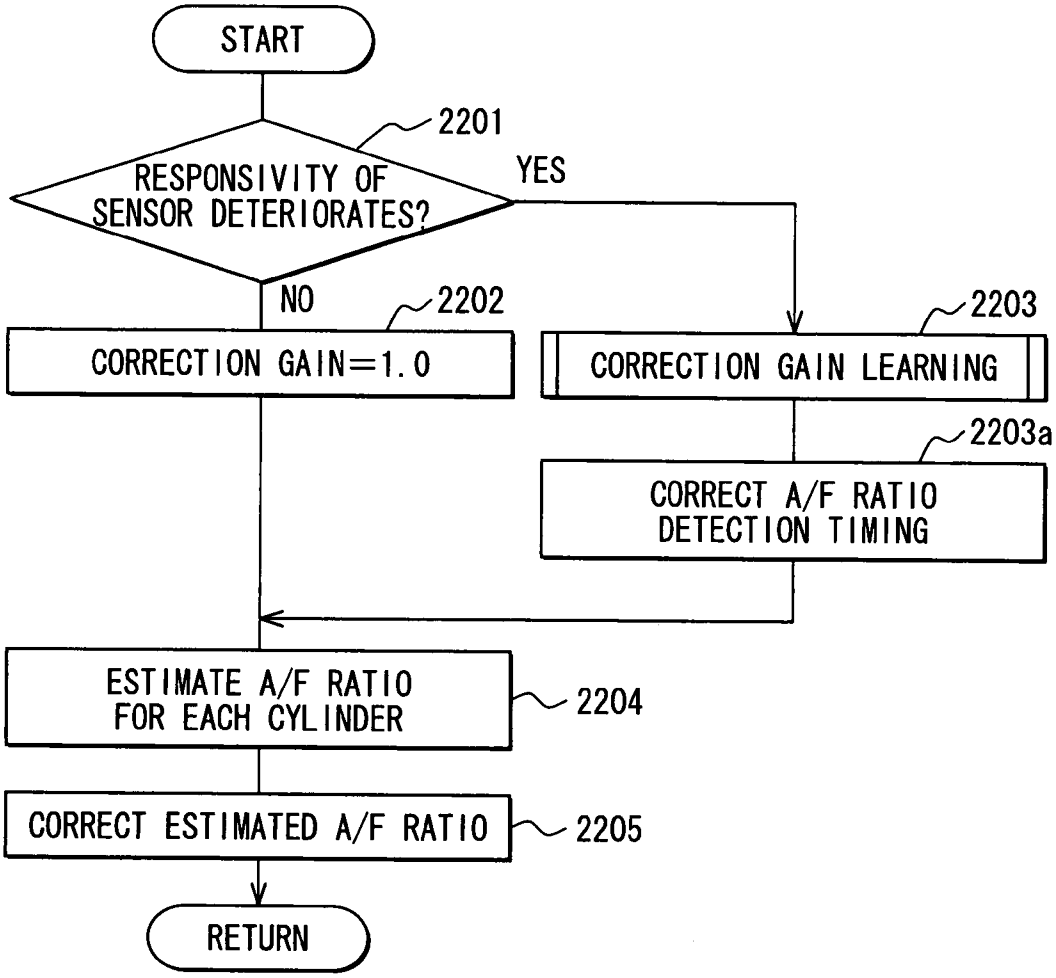
FIG. 11 is a flow chart to show the flow of the processing of a cylinder air-fuel ratio estimation routine of a third embodiment.

In this third embodiment, the cylinder air-fuel ratio estimation routine (to be described later) shown in FIG. 11 is performed to thereby correct the timing when the air-fuel ratio is detected by the air-fuel ratio sensor 37 according to the degree of deterioration of the responsivity of the air-fuel ratio sensor 37 at the time of estimating the cylinder air-fuel ratio based on the output of the air-fuel ratio sensor 37.

In the cylinder air-fuel ratio estimation routine shown in FIG. 11, when it is determined in Step 2201 that the responsivity of the air-fuel ratio sensor 37 deteriorates, the routine proceeds to Step 2203. In this step, the above-mentioned correction gain learning routine shown in FIG. 7 is executed to detect the degree of deterioration of the responsivity of the air-fuel ratio sensor 37 in the high load range of the engine 11 to learn the correction gain relating to a decrease in the output of the air-fuel ratio sensor 37 based on the degree of deterioration of the responsivity of the air-fuel ratio sensor 37.

Then, the routine proceeds to Step 2203*a* where the timing of detecting an air-fuel ratio by the air-fuel ratio sensor 37 is corrected according to the degree of deterioration of the responsivity of the air-fuel ratio sensor 37. With this, the timing of detecting the air-fuel ratio by the air-fuel ratio sensor 37 is changed according to the degree of deterioration of the responsivity of the air-fuel ratio sensor 37, thereby being set to an appropriate timing.

Then, the air-fuel ratio of a cylinder, the air-fuel ratio of which is to be estimated this time, is estimated based on the detection value of the air-fuel ratio sensor 37 by the use of the cylinder air-fuel ratio estimation model. Then, the estimated air-fuel ratio of each cylinder is multiplied by the correction gain of the cylinder to correct the estimated air-fuel ratio of each cylinder to find a final estimated the air-fuel ratio (Steps 2204, 2205).

In this third embodiment described above, when the cylinder air-fuel ratio is estimated based on the output of the air-fuel ratio sensor 37, the timing of detecting the air-fuel ratio by the air-fuel ratio sensor 37 is corrected according to the degree of deterioration of the responsivity of the air-fuel ratio sensor 37. Thus, the timing of detecting the air-fuel ratio by the air-fuel ratio sensor 37 can be changed according to the degree of deterioration of the responsivity of the air-fuel ratio sensor 37, thereby being set to an appropriate timing. Hence, the estimate accuracy of the cylinder air-fuel ratio when the responsivity of the air-fuel ratio sensor 37 deteriorates can be further improved.

In this regard, in the respective second and third embodiments, the estimated value of the cylinder air-fuel ratio is always corrected by the use of the correction gain learned in the high load range. However, it is also recommendable to correct a correction gain learned in the high load range according to the engine operating state (for example, engine load) at the time of correcting the estimated value of the cylinder air-fuel ratio and to correct the estimated value of the cylinder air-fuel ratio by the use of the correction gain.

Fourth Embodiment

Next, a fourth embodiment of the present invention will be described with reference to FIG. 12 and FIG. 10.

Figure 12:
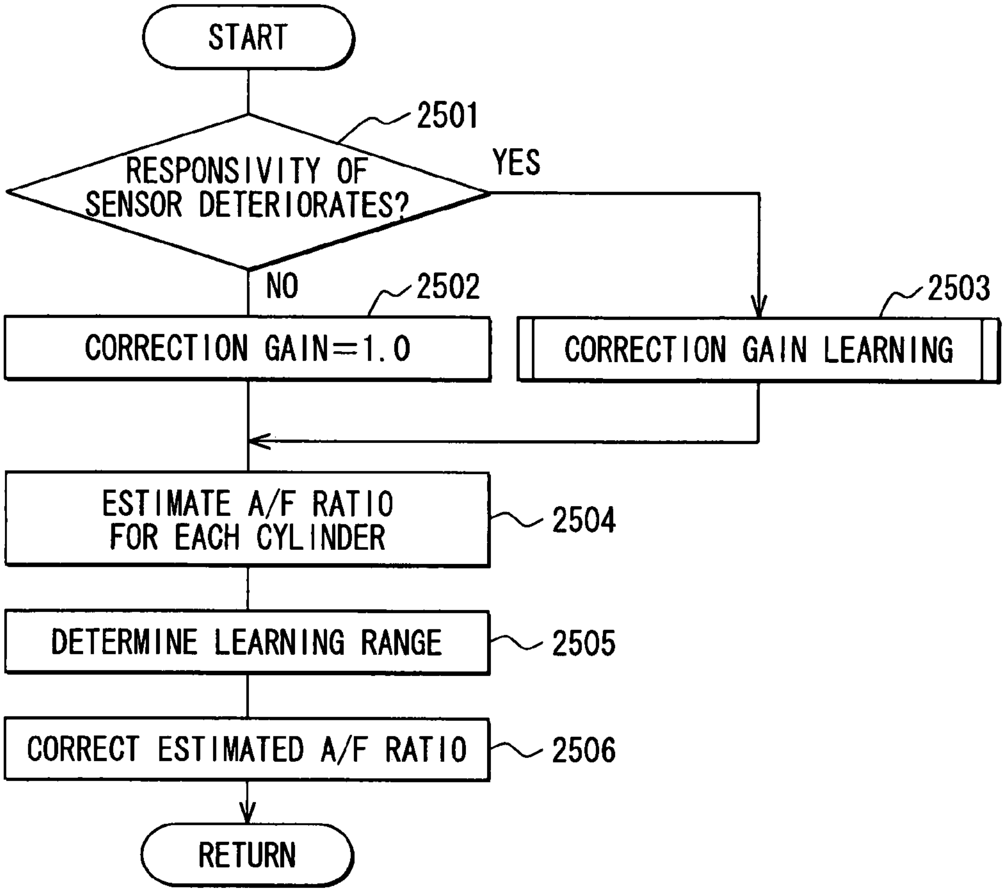
FIG. 12 is a flow chart to show the flow of the processing of a cylinder air-fuel ratio estimation routine of a fourth embodiment.
Figure 13:
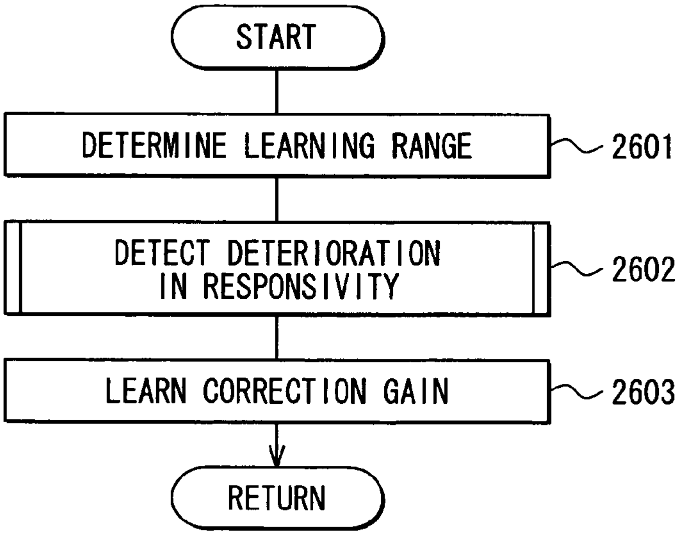
FIG. 13 is a flow chart to show the flow of the processing of a correction gain learning routine of the fourth embodiment.

In this fourth embodiment, the respective routines (to be described later) shown in FIG. 12 and FIG. 13 are executed. With this, the degree of deterioration of the responsivity of the air-fuel ratio sensor 37 is detected for each of plural learning ranges divided according to the operating state of the engine 11; a correction gain relating to a decrease in the output of the air-fuel ratio sensor 37 is learned for each of the learning ranges based on the degree of deterioration of the responsivity of air-fuel ratio sensor 37; and the estimated value of the cylinder air-fuel ratio is corrected for each of the learning ranges by the use of the correction gain.

In the cylinder air-fuel ratio estimation routine shown in FIG. 12, when it is determined in Step 2501 that the responsivity of the air-fuel ratio sensor 37 deteriorates, the routine proceeds to Step 2503 where a correction gain learning routine to be described later and shown in FIG. 13 is executed. With this, the degree of deterioration of the responsivity of the air-fuel ratio sensor 37 is detected for each of the plural learning ranges divided according to the operating state of the engine 11 (for example, engine load) and the correction gain relating to a decrease in the output of the air-fuel ratio sensor 37 is learned for each of the learning ranges based on the degree of deterioration of the responsivity of the air-fuel ratio sensor 37.

Then, the routine proceeds to Step 2504 where the air-fuel ratio of a cylinder, the air-fuel ratio of which is to be estimated this time, is estimated based on the detection value of the air-fuel ratio sensor 37 by the use of the cylinder air-fuel ratio estimation model. Then, the routine proceeds to Step 2505 where it is determined which of the plural learning ranges divided according to the engine operating range (for example, engine load) the present operating range belongs to.

Then, the routine proceeds to Step 2506 where the estimated air-fuel ratio of each cylinder is multiplied by the correction gain of the learning range corresponding to the present engine operating range to correct the estimated air-fuel ratio of each cylinder to find a final estimated air-fuel ratio of each cylinder.

In the correction gain learning routine shown in FIG. 13, first, it is determined in Step 2601 which of the plural learning ranges divided according to the engine operating range (for example, engine load) the present operating range belongs to.

Then, the routine proceeds to Step 2602 where the above-mentioned sensor responsivity degree-of-deterioration detection routine shown in FIG. 8 is executed to detect the degree of deterioration R of the responsivity of the air-fuel ratio sensor 37 in the learning range corresponding to the present engine operating range.

Then, the routine proceeds to Step 2603 where a correction gain relating to the degree of deterioration R of the responsivity of the air-fuel ratio sensor 37 in the learning range corresponding to the present engine operating range is computed by a map or a mathematical equation. With this, the correction gain relating to a decrease in the output of the air-fuel ratio sensor 37 is found and this correction gain is stored in the rewritable non-volatile memory of the ECU 40 such as a backup RAM to learn the correction gain. At this time, the learning value of the correction gain of the learning range corresponding to the present engine operating range is updated.

In this fourth embodiment described above, the degree of deterioration of the responsivity of the air-fuel ratio sensor 37 is detected for each of the plural learning ranges divided according to the operating state of the engine 11, and the correction gain relating to a decrease in the output of the air-fuel ratio sensor 37 is learned for each of the learning ranges on the basis the degree of deterioration of the responsivity of the air-fuel ratio sensor 37, and the estimated value of the cylinder air-fuel ratio is corrected for each of the learning ranges by the use of the correction gain. Thus, such estimate error of the cylinder air-fuel ratio that is caused by a decrease in the output of the air-fuel ratio sensor 37 can be corrected with high accuracy without being affected by the engine operating state.

Fifth Embodiment

The ECU 40 executes the cylinder air-fuel ratio abnormality diagnosis routine to be described later and shown in FIG. 15 and FIG. 16. With this, the ECU 40 estimates the air-fuel ratio of each cylinder based on the detection value of the air-fuel ratio sensor 37 by the use of the cylinder air-fuel ratio estimation model and computes the deviation of the estimated air-fuel ratio of each cylinder from the reference air-fuel ratio (average of the estimated air-fuel ratios of all cylinders or a control target value), thereby computing variation in the air-fuel ratio of each cylinder between the cylinders. Then, the ECU 40 compares the variation in the air-fuel ratio of each cylinder between the cylinders with a specified determination value to perform the cylinder air-fuel ratio diagnosis of determining whether or not the air-fuel ratio of each cylinder is abnormal.

By the way, in the cylinder air-fuel ratio estimation of estimating the air-fuel ratio of each cylinder by the use of the cylinder air-fuel ratio estimation model for relating the detection value of one air-fuel ratio sensor 37 disposed in the exhaust confluent portion 36 to the air-fuel ratio of each cylinder, the estimate accuracy of the cylinder air-fuel ratio estimation is varied by the engine operating state (for example, engine speed or load). For example, the estimate accuracy of the cylinder air-fuel ratio estimation tends to increase in the low rotation range in which the exhaust interval of the exhaust gas of each cylinder is elongated or in the high load range in which an exhaust gas quantity is increased, whereas the estimate accuracy of the cylinder air-fuel ratio estimation decreases in the high rotation range in which the exhaust interval of exhaust gas of each cylinder is shortened or in the low load range in which an exhaust gas quantity is decreased.

Further, in the cylinder air-fuel ratio estimation of estimating the air-fuel ratio of each cylinder based on the detection value of the air-fuel ratio sensor 37 disposed in the exhaust confluent portion 36, when the responsivity of the air-fuel ratio sensor 37 deteriorates because of age deterioration or the like, there is a possibility that the estimate accuracy of the cylinder air-fuel ratio estimation might be decreased.

When the cylinder air-fuel ratio control and the cylinder air-fuel ratio abnormality diagnosis are performed by the use of the estimated air-fuel ratio of each cylinder, which is affected and decreased in accuracy in this manner by the engine operating state and the responsivity of the air-fuel ratio sensor 37, there is a possibility that the control accuracy of the cylinder air-fuel ratio control and the diagnosis accuracy of the cylinder air-fuel ratio abnormality diagnosis might decrease.

To take measures against this, in a fifth embodiment, first, the estimated air-fuel ratio of each cylinder is corrected according to the engine operating state (for example, engine speed or load) to correct such estimate error of the estimated air-fuel ratio of each cylinder that is caused by a change in the engine operating state with high accuracy, and then the estimated air-fuel ratio of each cylinder is further corrected according to the responsivity of the air-fuel ratio sensor 37 to correct such estimate error of the estimated air-fuel ratio of each cylinder that is caused by a decrease in the responsivity of the air-fuel ratio sensor 37 with high accuracy. The cylinder air-fuel ratio control and the cylinder air-fuel ratio abnormality diagnosis are performed by the use of the estimated air-fuel ratio of each cylinder, which is increased in the estimate accuracy by these corrections, to improve the control accuracy of the cylinder air-fuel ratio control and the diagnosis accuracy of the cylinder air-fuel ratio abnormality diagnosis.

The cylinder air-fuel ratio control and the cylinder air-fuel ratio abnormality diagnosis described above are performed by the ECU 40 according to the respective routines shown in FIG. 14 to FIG. 17. The processing contents of the respective routines will be described.

[Cylinder Air-Fuel Ratio Control Routine]

Figure 14:
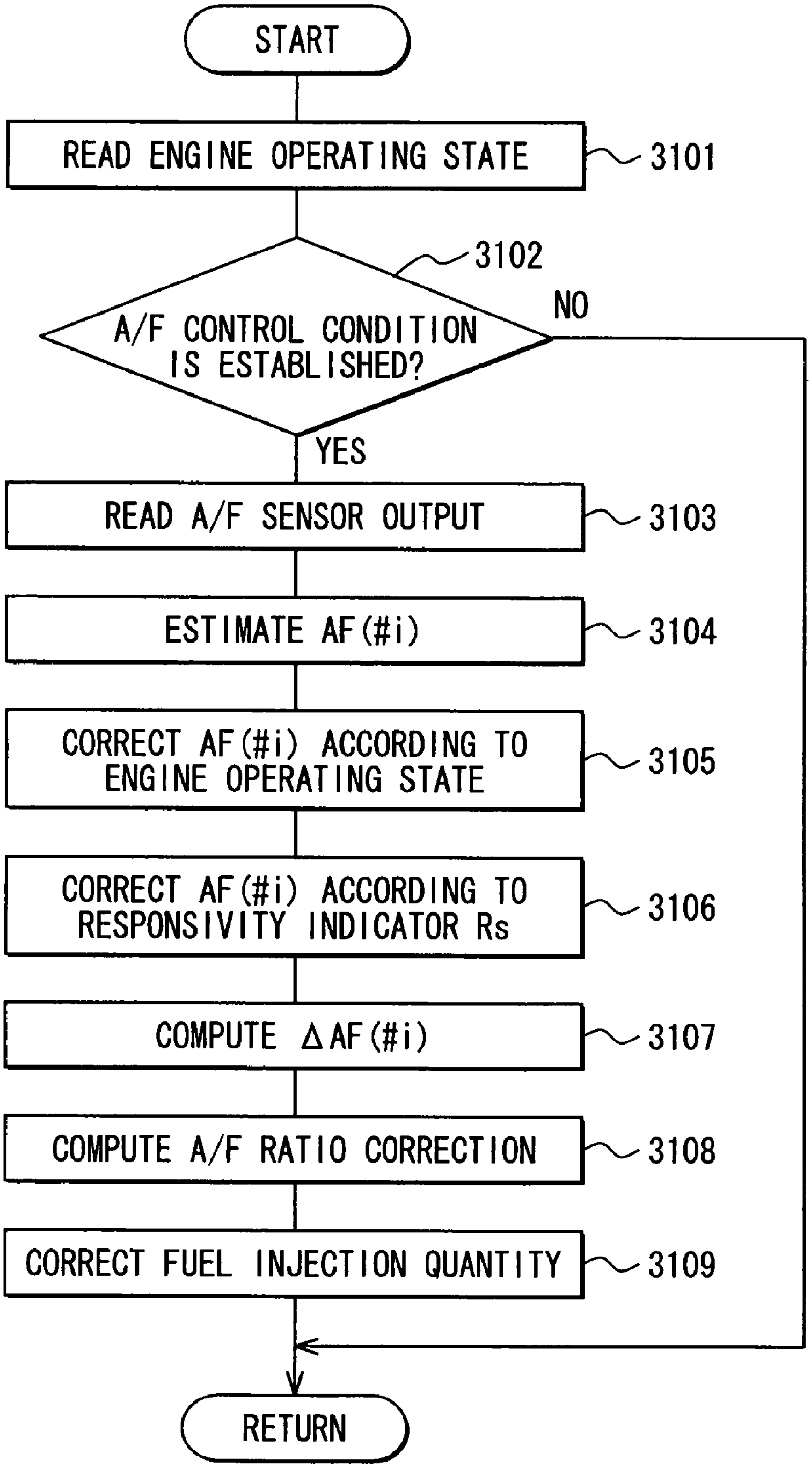
FIG. 14 is a flow chart to show the flow of the processing of a cylinder air-fuel ratio control routine.

The cylinder air-fuel ratio control routine shown in FIG. 14 is executed at specified intervals while the power of the ECU 40 is on. In Step 3101, the engine operating state such as the engine speed and the load (the intake pipe pressure and the intake air quantity) is read and then the routine proceeds to Step 3102 where it is determined whether or not a specified cylinder air-fuel ratio control performance condition is established. As a result, when it is determined that the specified cylinder air-fuel ratio control performance condition is not established, this routine is finished without performing processing in the next step and subsequent steps.

In contrast to this, when it is determined in Step 3102 that the specified cylinder air-fuel ratio control performance condition holds, this routine proceeds to Step 3103 where the output of the air-fuel ratio sensor 37 (detection value of air-fuel ratio) is read and then the routine proceeds to Step 3104 where the air-fuel ratio AF(#i) of the i-th cylinder #i (i=1 to 4 in the case of a four-cylinder engine), the air-fuel ratio of which is to be estimated this time, is estimated based on the detection value of the air-fuel ratio sensor 37 by the use of the cylinder air-fuel ratio estimation model.

Then, the routine proceeds to Step 3105 where the estimated air-fuel ratio AF(#i) is corrected according to the engine operating state (for example, the engine speed and the load).

Figure 18:
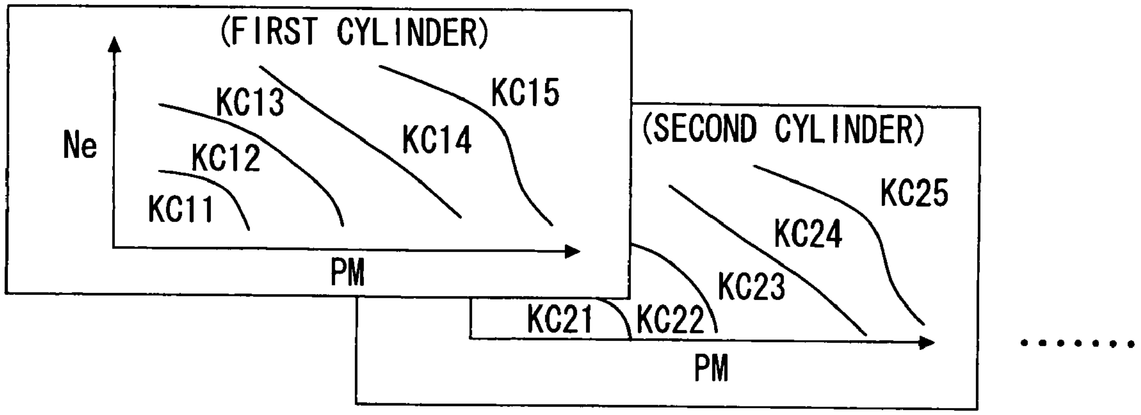
FIG. 18 is a diagram to conceptually show one example of a map of a correction factor KC.
Figure 19:
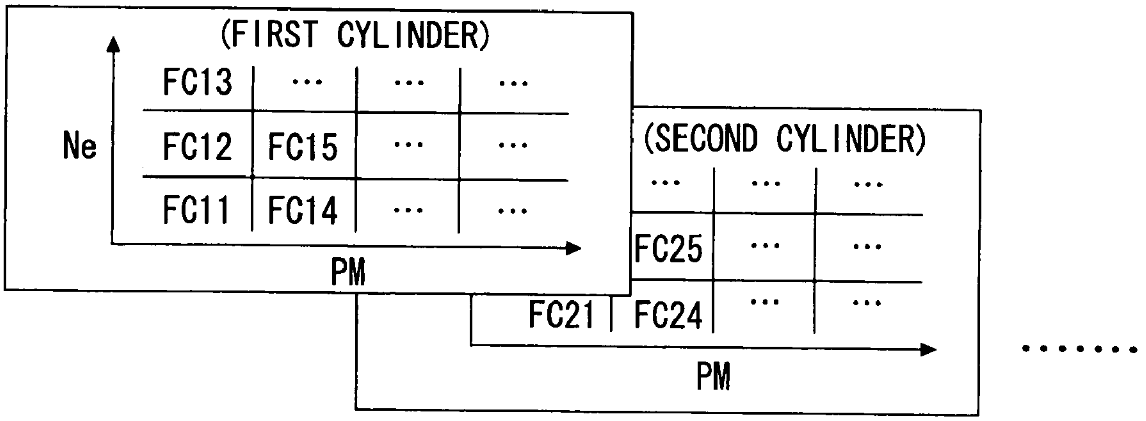
FIG. 19 is a diagram to conceptually show one example of a map of a correction quantity FC.

Specifically, the correction factor KC(#i) of the i-th cylinder #i relating to an engine speed NE and an intake pipe pressure PM (or an intake air quantity) are computed with reference to a map of a correction factor KC shown in FIG. 18. In addition, the correction quantity FC(#i) of the i-th cylinder #i relating to the engine speed NE and the intake pipe pressure PM (or the intake air quantity) are computed with reference to a map of a correction quantity FC shown in FIG. 19. The map of the correction factor KC(#i) and the map of the correction quantity FC(#i) are set previously for each cylinder based on test data, design data, and the like.

Then, the estimated air-fuel ratio AF(#i) of the i-th cylinder #i is multiplied by the correction factor KC(#i) and the correction quantity FC(#i) is added to the product of the estimated air-fuel ratio AF(#i) and the correction factor KC(#i) to correct such estimate error of the estimated air-fuel ratio AF(#i) of the i-th cylinder #i that is caused by a change in the engine operating state.

$$AF(\#i)=AF(\#i)\times KC(\#i)+FC(\#i)$$

Here, when the estimate error of the estimated air-fuel ratio AF(#i) can be corrected to some extent only by the correction factor KC(#i), only the correction factor KC(#i) may be computed and the estimated air-fuel ratio AF(#i) may be multiplied by the correction factor KC(#i) to correct the estimated air-fuel ratio AF(#i).

$$AF(\#i)=AF(\#i)\times KC(\#i)$$

Moreover, when the estimate error of the estimated air-fuel ratio AF(#i) can be corrected to some extent only by the correction quantity FC(#i), only the correction quantity FC(#i) may be computed and be added to the estimated air-fuel ratio AF(#i) to correct the estimated air-fuel ratio AF(#i).

$$AF(\#i)=AF(\#i)+FC(\#i)$$

Then, the routine proceeds to Step 3106 where the estimated air-fuel ratio AF(#i) of each cylinder is corrected according to the responsivity of the air-fuel ratio sensor 37.

Figure 17:
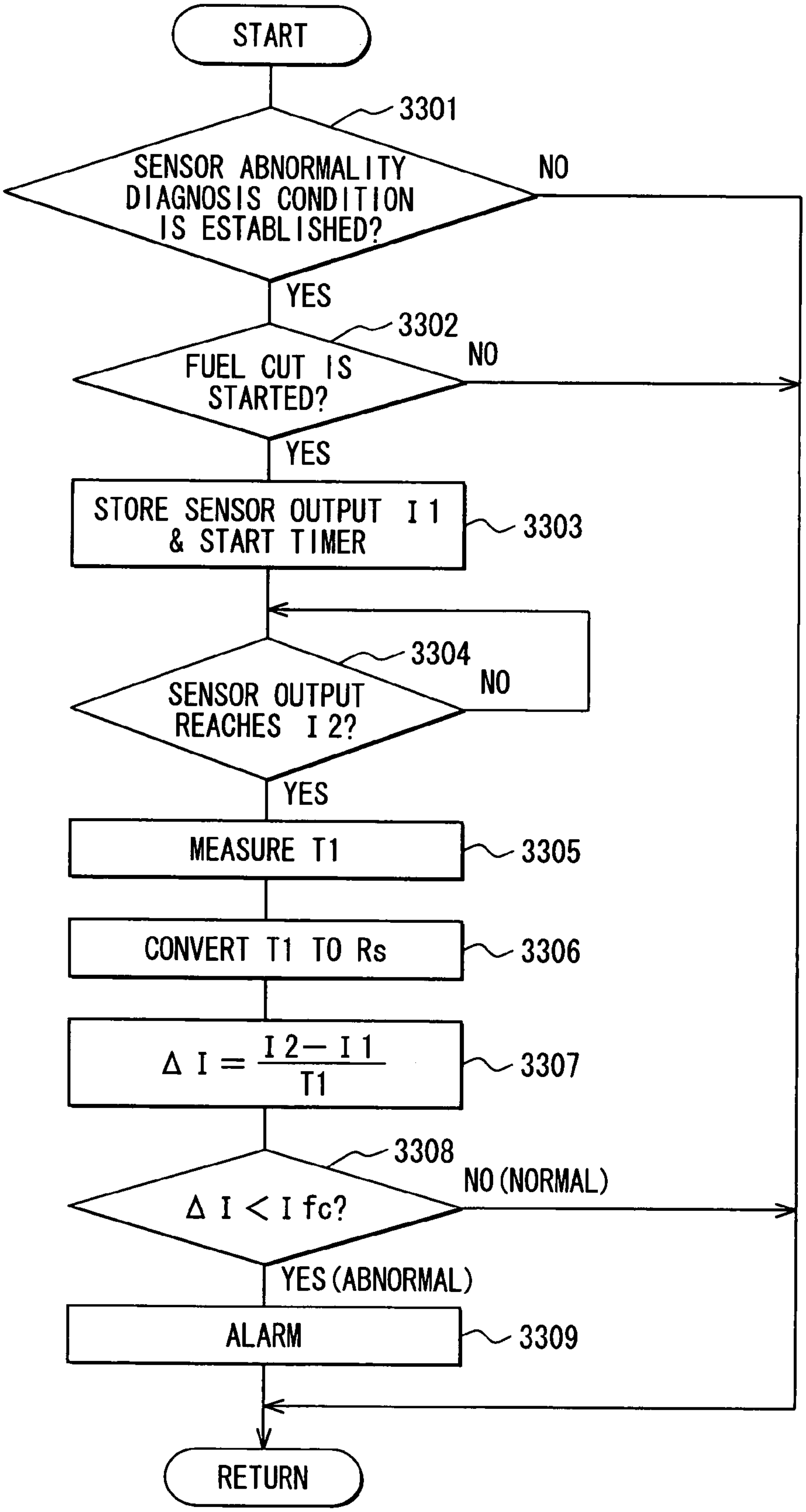
FIG. 17 is a flow chart to show the flow of the processing of a sensor abnormality diagnosis routine.

Specifically, a correction factor corresponding to a responsivity indicator Rs of the air-fuel ratio sensor 37, which is computed by a sensor abnormality diagnosis routine to be described later and shown in FIG. 17, is computed by a map or the like and the estimated air-fuel ratio AF(#i) of each cylinder is corrected by the use of this correction factor. This corrects such estimate error of the estimated air-fuel ratio AF(#i) that is caused by a decrease in the responsivity of the air-fuel ratio sensor 37. At this time, the estimated air-fuel ratio AF(#i) of each cylinder may be corrected across the board by the same correction factor, but the estimated air-fuel ratio AF(#i) of each cylinder may be corrected by a correction factor multiplied by a weight for each cylinder. Here, processing dedicated for detecting the responsivity of the air-fuel ratio sensor 37 may be performed aside from the sensor abnormality diagnosis routine to find the responsivity indicator Rs of the air-fuel ratio sensor 37.

Then, the routine proceeds to Step 3107 where the deviation of the estimated air-fuel ratio AF(#i) of the i-th cylinder #i, which is corrected according to the engine operating state and the responsivity of the air-fuel ratio sensor 37, from the reference air-fuel ratio (the average of estimated air-fuel ratios of all cylinders or the control target value) is computed to thereby compute variation ΔAF(#i) in the air-fuel ratio of the i-th cylinder #i between the cylinders.

Then, the routine proceeds to Step 3108 where the air-fuel ratio correction quantity of each cylinder (correction quantity of the fuel injection quantity of each cylinder) is computed so as to reduce the variation ΔAF(#i) in the air-fuel ratio of each cylinder between the cylinders. Then, the routine proceeds to Step 3109 where the cylinder air-fuel ratio control is performed which corrects the fuel injection quantity of each cylinder based on the air-fuel ratio correction quantity of each cylinder to correct the air-fuel ratio of the air-fuel mixture, which is to be supplied to each cylinder, for each cylinder to thereby reduce the variation ΔAF(#i) in the air-fuel ratio of each cylinder between the cylinders.

[Cylinder Air-Fuel Ratio Abnormality Diagnosis Routine]

Figure 15:
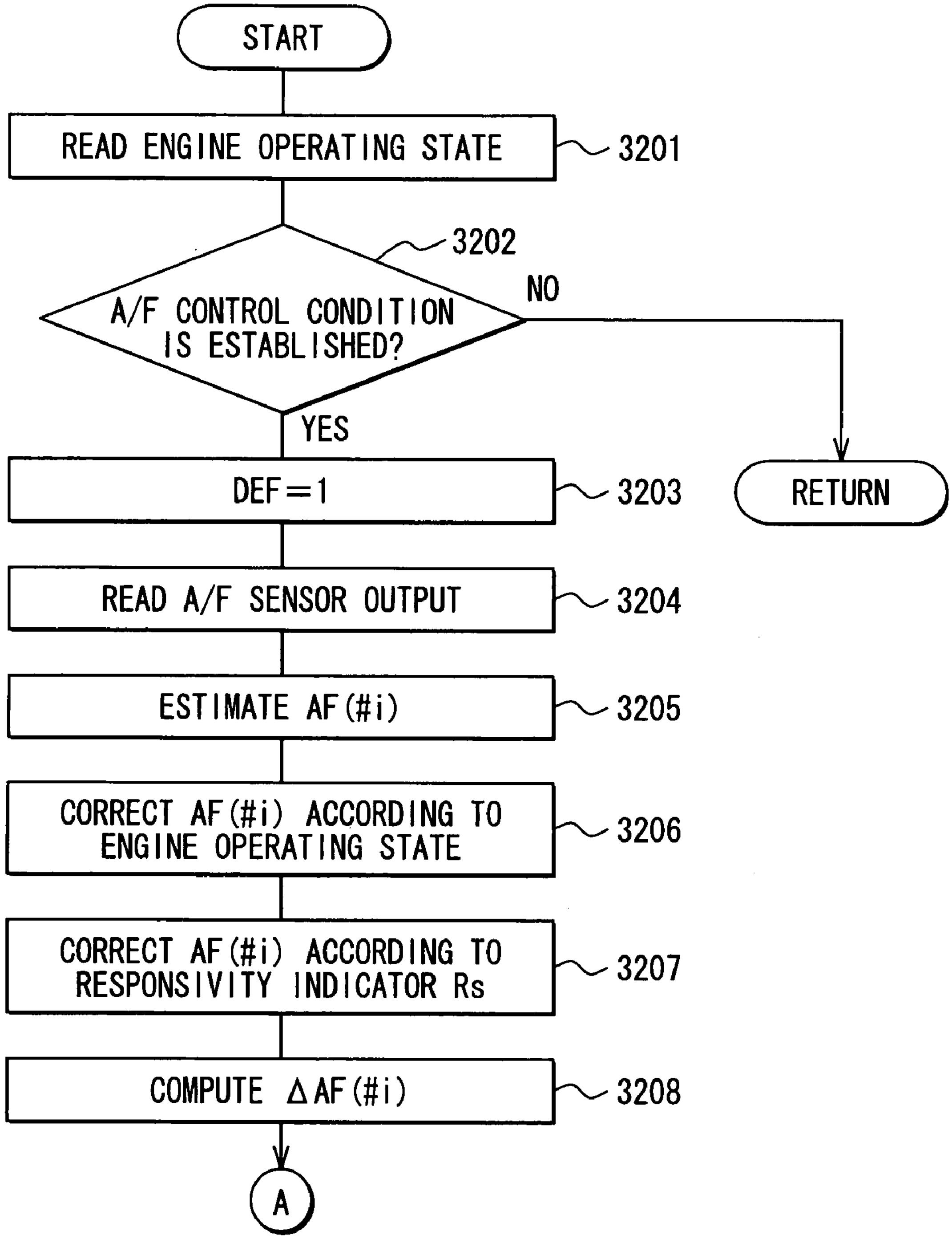
FIG. 15 is a flow chart to show the flow of the processing of a cylinder air-fuel ratio abnormality diagnosis routine.
Figure 16:
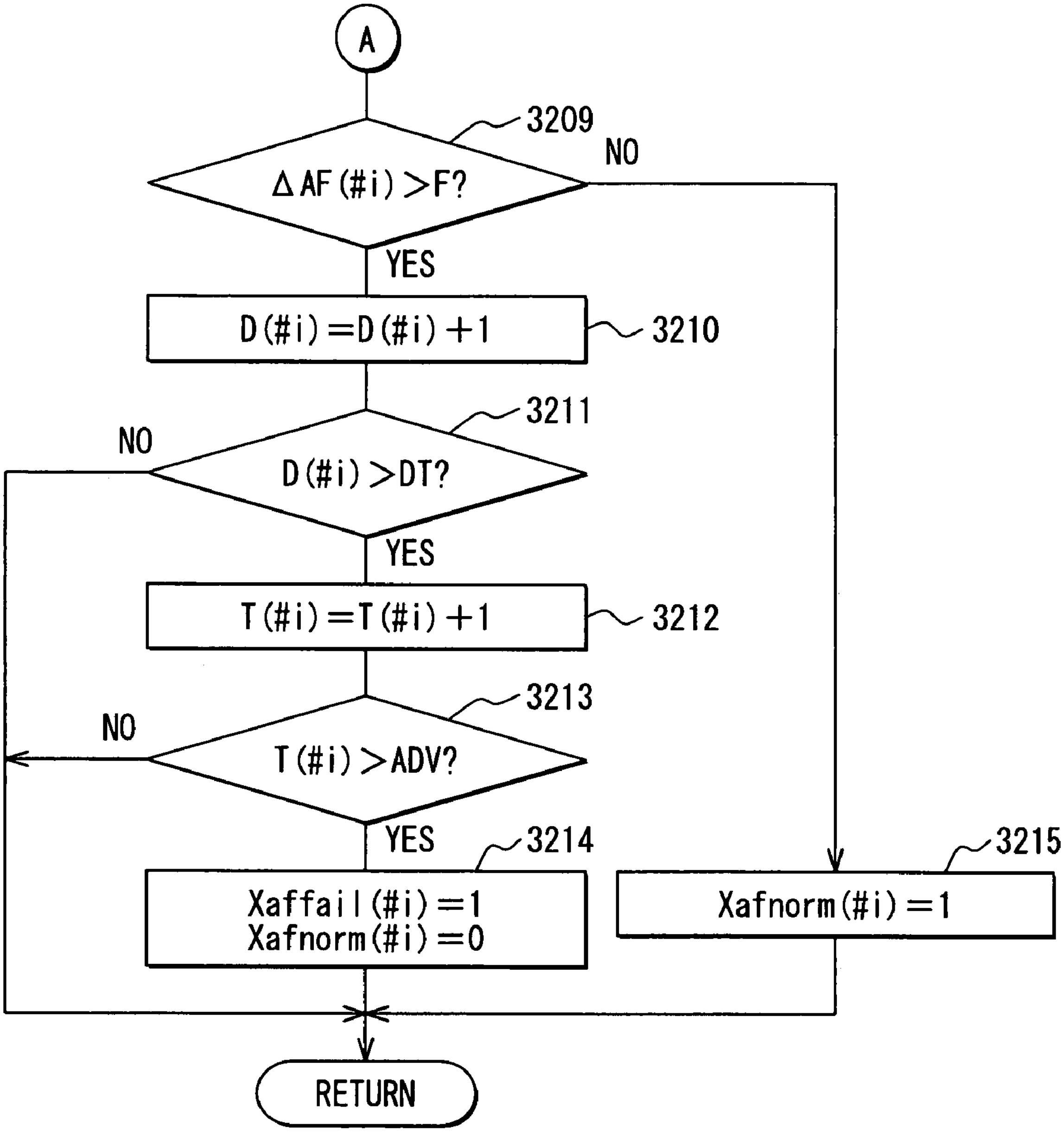
FIG. 16 is a flow chart to show the flow of the processing of a cylinder air-fuel ratio abnormality diagnosis routine.

The cylinder air-fuel ratio abnormality diagnosis routine shown in FIG. 15 and FIG. 16 is executed at specified intervals while the power of the ECU 40 is on. When this routine is started, first, in Step 3201, the engine operating state such as the engine speed and the load (intake pipe pressure and intake air quantity) is read. Then, the routine proceeds to Step 3202 where it is determined whether or not a specified cylinder air-fuel ratio abnormality diagnosis condition is established. As a result, when it is determined that the specified cylinder air-fuel ratio abnormality diagnosis condition does not hold, this routine is finished without performing processing in the next step and subsequent steps.

In contrast to this, when it is determined in Step 3202 that the specified cylinder air-fuel ratio abnormality diagnosis condition holds, this routine proceeds to Step 3203 where a diagnosis execution flag DEF is set to "1". Then, in the following Steps 3204 to 3208, the same processing as in the Steps 3103 to 3107 shown in FIG. 14 is performed to find the estimated air-fuel ratio AF(#i) based on the detection value of the air-fuel ratio sensor 37. This estimated air-fuel ratio AF(#i) is corrected according to the engine operating state and the responsivity of the air-fuel ratio sensor 37. Then, the deviation of the corrected estimated air-fuel ratio AF(#i) from the reference air-fuel ratio is computed to compute the variation ΔAF(#i) in the air-fuel ratio between the cylinders. Here, the variation ΔAF(#i) in the air-fuel ratio between the cylinders, which is computed in the Step 3107 shown in FIG. 14, may be read.

Then, the routine proceeds to Step 3209 shown in FIG. 16 where it is determined whether or not the variation ΔAF(#i) in the air-fuel ratio of the i-th cylinder #i between the cylinders are larger than a specified determination value F. As a result, when it is determined that the variation ΔAF(#i) in the air-fuel ratio of the i-th cylinder #i between the cylinders is not larger than the specified determination value F, the routine proceeds to Step 3215 where it is determined that the air-fuel ratio of the i-th cylinder #i is not abnormal (is normal) and where the normal flag Xafnorm(#i) of the i-th cylinder #i is set to "1" and then this routine is finished.

In contrast to this, when it is determined in the Step 3209 that the variation ΔAF(#i) in the air-fuel ratio of the i-th cylinder #i between the cylinders is larger than the specified determination value F, the routine proceeds to Step 3210 where the count value of the delay counter D(#i) of the i-th cylinder #i is incremented by "1", the delay counter D(#i) measuring the time that elapses after the variation ΔAF(#i) in the air-fuel ratio of the i-th cylinder #i between the cylinders becomes larger than the specified determination value F. Then, the routine proceeds to Step 3211 where it is determined whether or not the count value of the delay counter D(#i) becomes larger than a specified delay value. With this, it is determined whether or not a specified time elapses after the variation ΔAF(#i) in the air-fuel ratio between the cylinders becomes larger than the specified determination value F.

When it is determined in this Step 3211 that the count value of the delay counter D(#i) becomes larger than a specified delay value (in other words, it is determined that a specified time elapses after the variation ΔAF(#i) in the air-fuel ratio between the cylinders becomes larger than the specified determination value F), the routine proceeds to Step 3212 where the processing of incrementing the count value of the abnormality counter T(#i) of the i-th cylinder #i by "1" is started. Then, the routine proceeds to Step 3213 where it is determined whether or not the count value of the abnormality counter T(#i) becomes larger than a specified abnormality determination value ADV.

When it is determined in this Step 3213 that the count value of the abnormality counter T(#i) is not larger than the specified abnormality determination value, this routine is finished without performing any more processing. When the variation ΔAF(#i) in the air-fuel ratio between the cylinders is larger than the determination value F, the processing of incrementing the count value of the abnormality counter T(#i) (Steps 3201 to 3212) is repeatedly performed. Here, when the variation ΔAF(#i) in the air-fuel ratio between the cylinders is not larger than the determination value F, the count value of the abnormality counter T(#i) is not incremented but the present count value is held.

Then, when it is determined in Step 3213 that the count value of the abnormality counter T(#i) is larger than the specified abnormality determination value, the routine proceeds to Step 3214. In this step: it is determined that the air-fuel ratio of the i-th cylinder #i is abnormal. The abnormality flag Xaffail (#i) of the i-th cylinder #i is set to "1 and the normality flag Xafnorm (#i) of the i-th cylinder #i is held set to "0" or is reset. An alarm lamp (not shown) disposed in the instrument panel of the driver's seat is lit or an alarm is displayed on an alarm display part (not shown) of the instrument panel of the driver's seat to give the driver an alarm. Its abnormality information (abnormality code or the like) is stored in the rewritable non-volatile memory of the ECU 40 such as the backup RAM (not shown). Then, this routine is finished.

[Sensor Abnormality Diagnosis Routine]

The sensor abnormality diagnosis routine shown in FIG. 17 is executed at specified intervals while the power of the ECU 35 is on. When this routine is started, first, it is determined in Step 3301 whether or not a specified sensor abnormality diagnosis condition is established. As a result, when it is determined that the specified sensor abnormality diagnosis condition is not satisfied, this routine is finished without performing processing in the following and subsequent steps.

In contrast to this, when it is determined in Step 3301 that the specified sensor abnormality diagnosis condition holds, the routine proceeds to Step 3302 where it is determined whether or not fuel cut is started. When it is determined that fuel cut is started, the routine proceeds to Step 3303 where the output I1 of the air-fuel ratio sensor 37 when fuel cut is started is read and is stored in the memory of the ECU 40 and where a timer is started to measure the time that elapses after fuel cut is started.

Then, the routine proceeds to Step 3304 where it is determined whether or not the output of the air-fuel ratio sensor 37 reaches a specified value I2. When it is determined that the output of the air-fuel ratio sensor 37 is changed to the specified value I2, the routine proceeds to Step 3305 where a response time T1 that elapses after fuel cut is started until the output of the air-fuel ratio sensor 37 is changed to the specified value I2 is measured based on the count value of the timer.

Then, the routine proceeds to Step 3306 where the response time T1 of the air-fuel ratio sensor 37 is converted to a responsivity indicator Rs. In this case, for example, by assuming that the reciprocal of the response time T1 is the responsivity indicator Rs, the responsivity indicator Rs is set in such a way that as the responsivity of the air-fuel ratio sensor 37 is higher (that is, the response time T1 is shorter), the responsivity indicator Rs is larger. This responsivity indicator Rs is used at the time of correcting the estimated air-fuel ratio according to the responsivity of the air-fuel ratio sensor 37 in the cylinder air-fuel ratio control routine shown in FIG. 14 and in the cylinder air-fuel ratio abnormality diagnosis routine shown in FIG. 16 and FIG. 17.

Then, the routine proceeds to Step 3307 where the rate of change ΔI in the output of the air-fuel ratio sensor 37 is computed by the following equation.

$$\Delta I=(I2-I1)/T1$$

Here, this rate of change ΔI in the output of the air-fuel ratio sensor 37 may be used as the responsivity indicator Rs.

Then, the routine proceeds to Step 3308 where it is determined whether or not the rate of change ΔI in the output of the air-fuel ratio sensor 37 is smaller than a specified abnormality determination value Ifc.

As a result, when it is determined that the rate of change ΔI in the output of the air-fuel ratio sensor 37 is smaller than the specified abnormality determination value Ifc, it is determined that the air-fuel ratio sensor 37 is abnormal. Then, the routine proceeds to Step 3309. In this step: an alarm lamp (not shown) disposed in the instrument panel of the driver's seat is turned on or an alarm is displayed on an alarm display part (not shown) of the instrument panel of the driver's seat to give the driver an alarm. Its abnormality information (abnormality code or the like) is stored in the rewritable non-volatile memory of the ECU 40 such as the backup RAM (not shown). Then, this routine is finished.

In contrast to this, when it is determined in the Step 3308 that the rate of change ΔI in the output of the air-fuel ratio sensor 37 is not smaller than the specified abnormality determination value Ifc, it is determined that the air-fuel ratio sensor 37 is not abnormal (is normal). Then, this routine is finished.

Figure 20:
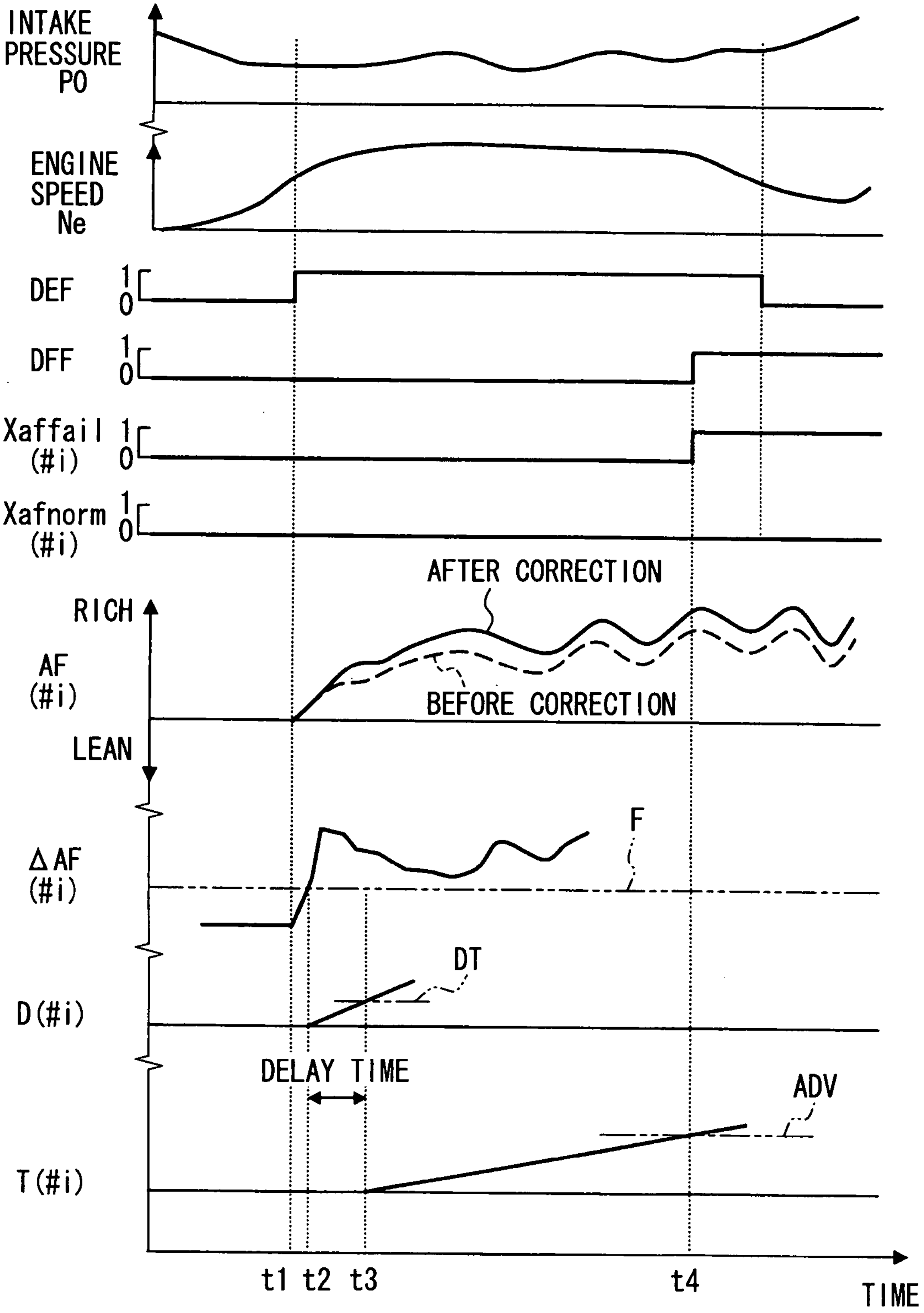
FIG. 20 is a time chart to show an example of a cylinder air-fuel ratio abnormality diagnosis.

An example of the cylinder air-fuel ratio abnormality diagnosis of the fifth embodiment described above will be described by the use of the time chart shown in FIG. 20. As shown in FIG. 20, at the point t1 in time when the cylinder air-fuel ratio abnormality diagnosis performance condition holds, the diagnosis performance flag is set to "1" and the cylinder air-fuel ratio abnormality diagnosis is started.

First, the estimated air-fuel ratio AF(#i) of the i-th cylinder #i is found based on the detection value of the air-fuel ratio sensor 37. Then, this estimated air-fuel ratio AF(#i) is corrected according to the engine operating state (the engine speed NE and the intake pipe pressure PO) and the responsivity of the air-fuel ratio sensor 37. Then, the deviation of the estimated air-fuel ratio AF(#i) after correction from the reference air-fuel ratio is computed, whereby the variation ΔAF (#i) in the air-fuel ratio between the cylinders is computed.

At the point t2 in time when the variation ΔAF(#i) in the air-fuel ratio between the cylinders becomes larger than the specified determination value F, the processing of incrementing the count value of the delay counter D(#i) is started. At the point t3 in time when the count value of the delay counter D(#i) becomes larger than a specified delay value (in other words, a specified delay time elapses after the variation ΔAF (#i) in the air-fuel ratio between the cylinders becomes larger than the specified determination value F), the processing of incrementing the count value of the abnormality counter T(#i) is started.

Then, at the point t4 in time when the count value of the abnormality counter T(#i) becomes larger than a specified abnormality determination value ADV, it is determined that the air-fuel ratio of the i-th cylinder #i is abnormal and the abnormality flag Xaffail (#i) of the i-th cylinder #i is set to "1" and the diagnosis finish flag is set to "1" and the cylinder air-fuel ratio abnormality diagnosis is finished.

In the fifth embodiment described above, the air-fuel ratio of each cylinder is estimated based on the detection value of the air-fuel ratio sensor 37 and the estimated air-fuel ratio of each cylinder is corrected according to the engine operating state (for example, the engine speed and the load). Thus, such estimate error of the estimated air-fuel ratio of each cylinder that is caused by a change in the engine operating state can be corrected with high accuracy. Further, since the estimated air-fuel ratio of each cylinder is corrected according to the responsivity of the air-fuel ratio sensor 37, such estimate error of the estimated air-fuel ratio of each cylinder that is caused by a decrease in the responsivity of the air-fuel ratio sensor 37 can be corrected with high accuracy. Hence, the estimated air-fuel ratio of each cylinder can be found with high accuracy without being affected by the engine operating state and the responsivity of the air-fuel ratio sensor 37.

The cylinder air-fuel ratio control and the cylinder air-fuel ratio abnormality diagnosis are performed by the use of the estimated air-fuel ratio of each cylinder, which is estimated with an estimate accuracy improved by these corrections, so the control accuracy of the cylinder air-fuel ratio control and the diagnosis accuracy of the cylinder air-fuel ratio abnormality diagnosis can be improved.

Here, in the above-mentioned embodiment, the estimated air-fuel ratio of each cylinder is corrected according to the engine operating state and further the estimated air-fuel ratio of each cylinder is corrected according to the responsivity of the air-fuel ratio sensor 37. However, when the effect of the responsivity of the air-fuel ratio sensor 37 is small (for example, when the responsivity of the air-fuel ratio sensor 37 hardly deteriorates), the correction relating to the responsivity of the air-fuel ratio sensor 37 may be omitted. Furthermore, the method for correcting the estimated air-fuel ratio of each cylinder according to the engine operating state and the method for correcting the estimated air-fuel ratio of each cylinder according to the responsivity of the air-fuel ratio sensor 37 are not limited to the methods described in the above-mentioned embodiments but, needless to say, may be changed as appropriate.

In this regard, in the respective second to fifth embodiments, the air-fuel ratio of each cylinder is estimated by the use of the cylinder air-fuel ratio estimation model for relating the detection value of the air-fuel ratio sensor 37 to the air-fuel ratio of each cylinder. However, the method for estimating a cylinder air-fuel ratio is not limited to the method using the cylinder air-fuel ratio estimation model but may be changed as appropriate: for example, the air-fuel ratio of each cylinder may be estimated based on the output of the air-fuel ratio sensor 37 when the air-fuel ratio dither control of forcibly changing an air-fuel ratio for each cylinder is performed.

Furthermore, in the above-mentioned embodiments, the present invention is applied to the four-cylinder engine, but the present invention may be applied to a two-cylinder engine, a three-cylinder engine, or an engine having five or more cylinders.

What is claimed is:

1. A cylinder abnormality diagnosis apparatus of an internal combustion engine, comprising:

an air-fuel ratio sensor for detecting an air-fuel ratio of exhaust gas which is disposed in an exhaust confluent portion where the exhaust gases from a plurality of cylinders of the internal combustion engine merge with each other;

an air-fuel ratio estimation means for performing a cylinder air-fuel ratio estimation of estimating an air-fuel ratio of each cylinder based on a detection value of the air-fuel ratio sensor;

an abnormality diagnosis means for performing a cylinder abnormality diagnosis of determining whether each cylinder is abnormal based on an estimate result of the cylinder air-fuel ratio estimation; and a determination means for determining whether or not an operating state of the internal combustion engine is within a specified operating range in which an estimate accuracy of the cylinder air-fuel ratio estimation increases, wherein when it is determined by the determination means that the operating state of the internal combustion engine is within the specified operating range, the abnormality diagnosis means performs the cylinder abnormality diagnosis.

2. The cylinder abnormality diagnosis apparatus of an internal combustion engine as claimed in claim 1, further comprising:

an air-fuel ratio control means for performing a cylinder air-fuel ratio control of controlling an air-fuel ratio of each cylinder so as to reduce variation in an air-fuel ratio of each cylinder between the cylinders based on an estimate result of the cylinder air-fuel ratio estimation, wherein even when the operating state of the internal combustion engine is within an operating range other than the specified operating, the air-fuel ratio estimation means performs the cylinder air-fuel ratio estimation and the air-fuel ratio control means performs the cylinder air-fuel ratio control.

3. The cylinder abnormality diagnosis apparatus of an internal combustion engine as claimed in claim 1, wherein when the internal combustion engine rotates at a small number of revolutions, the determination means determines that the operating state of the internal combustion engine is within the specified operating range.

4. The cylinder abnormality diagnosis apparatus of an internal combustion engine as claimed in claim 1, wherein when the internal combustion engine is at a high load, the determination means determines that the operating state of the internal combustion engine is within the specified operating range.

5. The cylinder abnormality diagnosis apparatus of an internal combustion engine as claimed in claim 1, wherein when the internal combustion engine rotates at a small number of revolutions and is at a high load, the determination means determines that the operating state of the internal combustion engine is within the specified operating range.

6. A controller of an internal combustion engine comprising:

an air-fuel ratio sensor disposed in an exhaust confluent portion where exhaust gases from a plurality of cylinders of the internal combustion engine merge with each other, a sensor deterioration detection means for detecting a degree of deterioration of responsivity of the air-fuel sensor in a high load range of the internal combustion engine;

a correction gain learning means for learning a correction gain relating to a decrease in an output of the air-fuel ratio sensor based on the degree of deterioration of responsivity of the air-fuel ratio sensor that is detected by the sensor deterioration detection means; and an air-fuel ratio correction means for correcting an estimated value of the air-fuel ratio of each cylinder by the use of the correction gain learned by the correction gain learning means.

7. A controller of an internal combustion engine comprising:

an air-fuel ratio sensor disposed in an exhaust confluent portion where exhaust gases from a plurality of cylinders of the internal combustion engine merge with each other;

a sensor deterioration detection means for detecting a degree of deterioration of responsivity of the air-fuel sensor for each of a plurality of learning ranges divided according to an operating state of the internal combustion engine;

a correction gain learning means for learning a correction gain relating to a decrease in an output of the air-fuel ratio sensor based on the degree of deterioration of responsivity of the air-fuel ratio sensor that is detected for each of the learning ranges by the sensor deterioration detection means; and an air-fuel ratio correction means for correcting an estimated value of the air-fuel ratio of each cylinder by the use of the correction gain learned for each of the learning ranges by the correction gain learning means.

8. The controller of an internal combustion engine as claimed in claim 6, further comprising:

a detection timing correction means for correcting a timing of detecting an air-fuel ratio by the air-fuel ratio sensor according to a degree of deterioration of responsivity of the air-fuel ratio sensor that is detected by the sensor deterioration detection means at a time of estimating the cylinder air-fuel ratio based on an output of the air-fuel ratio sensor.

9. The controller of an internal combustion engine as claimed in claim 6, further comprising:

a variation detection means for detecting variation in an air-fuel ratio of each cylinder between the cylinders based on an estimated value of the air-fuel ratio of each cylinder that is corrected by the air-fuel ratio correction means by the use of the correction gain.

10. A controller of an internal combustion engine comprising:

an air-fuel ratio sensor for detecting an air-fuel ratio of exhaust gas which is disposed in an exhaust confluent portion where the exhaust gases from a plurality of cylinders of the internal combustion engine merge with each other;

an air-fuel ratio estimation means for estimating an air-fuel ratio of each cylinder based on a detection value of the air-fuel ratio sensor;

a correction means for correcting an estimated air-fuel ratio of each cylinder that is estimated by the air-fuel ratio estimation means according to an operating state of the internal combustion engine; and an air-fuel ratio control means for controlling an air-fuel ratio of each cylinder based on an estimated air-fuel ratio of each cylinder that is corrected by the correction means.

11. The control unit of an internal combustion engine as claimed in claim 10, further comprising:

a responsivity detection means for detecting responsivity of the air-fuel ratio sensor, wherein the correction means corrects an estimated air-fuel ratio of each cylinder that is estimated by the air-fuel ratio estimation means according to an operating state of the internal combustion engine and to responsivity of the air-fuel ratio sensor.

12. The control unit of an internal combustion engine as claimed in claim 10, further comprising:

an abnormality diagnosis means for determining whether an air-fuel ratio of each cylinder is abnormal based on an estimated air-fuel ratio of each cylinder that is corrected by the correction means.

* * * * *